US010029742B2

(12) United States Patent
Evans

(10) Patent No.: US 10,029,742 B2
(45) Date of Patent: Jul. 24, 2018

(54) HINGED LOAD PANEL FOR PACKAGE DELIVERY VEHICLES

(71) Applicant: Globe Composite Solutions, Ltd., Stoughton, MA (US)

(72) Inventor: Brian Charles Evans, Marshfield, MA (US)

(73) Assignee: Globe Composite Solutions, Ltd., Stoughton, MA (US)

(*) Notice: Subject to any disclaimer, the term of this patent is extended or adjusted under 35 U.S.C. 154(b) by 4 days.

(21) Appl. No.: 15/147,329

(22) Filed: May 5, 2016

(65) Prior Publication Data

US 2016/0244105 A1    Aug. 25, 2016

Related U.S. Application Data

(63) Continuation of application No. 14/102,282, filed on Dec. 10, 2013, now Pat. No. 9,359,015.

(60) Provisional application No. 61/878,725, filed on Sep. 17, 2013, provisional application No. 61/735,319, filed on Dec. 10, 2012.

(51) Int. Cl.
| | |
|---|---|
| *B62D 29/00* | (2006.01) |
| *B62D 33/02* | (2006.01) |
| *B62D 33/04* | (2006.01) |
| *E05D 5/02* | (2006.01) |
| *F16C 11/04* | (2006.01) |

(52) U.S. Cl.
CPC ......... *B62D 33/046* (2013.01); *E05D 5/0238* (2013.01); *F16C 11/04* (2013.01); *E05Y 2900/602* (2013.01); *E05Y 2900/604* (2013.01); *Y10T 16/545* (2015.01)

(58) Field of Classification Search
CPC .... B62D 33/046; B62D 29/04; B62D 29/046; E05D 5/0238; F16C 11/06
USPC ............................................. 211/90.02, 188
See application file for complete search history.

(56) References Cited

U.S. PATENT DOCUMENTS

| | | | |
|---|---|---|---|
| 1,351,125 A | 8/1920 | Rex | |
| 1,944,649 A * | 1/1934 | Smith, Sr. | ................ A47F 7/08 211/150 |
| 2,071,257 A | 2/1937 | Hansen | |
| 2,149,015 A | 2/1939 | Giddings | |
| 2,636,772 A | 4/1953 | Bridge | |
| 2,825,600 A | 3/1958 | Macomber | |

(Continued)

FOREIGN PATENT DOCUMENTS

JP    2001314307 A    11/2001

OTHER PUBLICATIONS

International Search Report and Written Opinion for PCT/US2014/056028 dated Dec. 26, 2014 (10 pages).

(Continued)

*Primary Examiner* — Joshua E Rodden
(74) *Attorney, Agent, or Firm* — Crowe & Dunlevy; Andre M. Szuwalski

(57) ABSTRACT

A system for use in a package delivery vehicle includes an edge railing, and a panel with a hinged edge and a free edge that is located opposite from the hinged edge. A panel hinge member is located at the hinged edge of the panel. A hinge body is mounted to the edge railing and pivotally coupled to the panel hinge member to allow the panel hinge member and the panel to pivot with respect to the hinge body. The panel and the panel hinge member are formed as a unitary monolithic body.

27 Claims, 17 Drawing Sheets

(56) References Cited

U.S. PATENT DOCUMENTS

| | | | |
|---|---|---|---|
| 3,875,871 A | 4/1975 | Thornton et al. | |
| 3,897,971 A | 8/1975 | Evans | |
| 3,911,832 A | 10/1975 | Vandergriff | |
| 4,281,870 A | 8/1981 | Ehrlich et al. | |
| 4,605,131 A * | 8/1986 | Debus | H02B 1/306 108/134 |
| 4,637,322 A * | 1/1987 | Hampshire | A47B 9/16 108/102 |
| 4,928,350 A | 5/1990 | Morgan | |
| 4,995,322 A | 2/1991 | Frederick | |
| 5,042,863 A | 8/1991 | Fraga | |
| 5,375,534 A | 12/1994 | Adams | |
| 5,452,972 A | 9/1995 | Adams | |
| 5,690,466 A | 11/1997 | Gaddis et al. | |
| 5,795,043 A * | 8/1998 | Johnson | B01L 1/50 312/229 |
| 6,065,251 A * | 5/2000 | Kindrick | A47K 3/001 108/157.13 |
| D426,933 S * | 6/2000 | Redfern | D21/491 |
| 6,152,312 A | 11/2000 | Nava et al. | |
| 6,585,306 B1 | 7/2003 | Smith et al. | |
| 6,854,400 B2 | 2/2005 | Sullivan | |
| D531,568 S * | 11/2006 | Davidian | D12/217 |
| 7,293,813 B2 * | 11/2007 | Squyres | B60P 1/00 105/372 |
| 7,370,899 B2 | 5/2008 | Powers, Jr. et al. | |
| 9,016,653 B1 * | 4/2015 | Cox, Jr. | B65D 19/0002 248/346.01 |
| 2001/0035664 A1 | 11/2001 | Steffens et al. | |
| 2002/0098071 A1 | 7/2002 | Henderson | |
| 2004/0134820 A1 * | 7/2004 | Katayama | B65H 75/185 206/389 |
| 2004/0251389 A1 | 12/2004 | Oddsen | |
| 2006/0180623 A1 | 8/2006 | Reynolds et al. | |
| 2006/0225609 A1 | 10/2006 | Rueger et al. | |
| 2007/0041803 A1 | 2/2007 | Whitehead et al. | |
| 2007/0062003 A1 | 3/2007 | Sullivan | |
| 2008/0012372 A1 | 1/2008 | Squyres et al. | |
| 2011/0139040 A1 * | 6/2011 | Apps | B65D 19/0018 108/53.3 |
| 2014/0061272 A1 | 3/2014 | Balthes et al. | |
| 2014/0110960 A1 | 4/2014 | Gilbert et al. | |
| 2015/0225021 A1 | 8/2015 | Evans | |

OTHER PUBLICATIONS

International Search Report and Written Opinion for PCT/US2015/025453 dated Aug. 19, 2015 (11 pages).

* cited by examiner

HINGED LOAD PANEL FOR PACKAGE DELIVERY VEHICLES

PRIORITY CLAIM

This application is a continuation application of U.S. patent application Ser. No. 14/102,282, filed on Dec. 10, 2013, now pending, which claims priority from U.S. Application for Patent No. 61/735,319 filed Dec. 10, 2012 and U.S. Application for Patent No. 61/878,725 filed Sep. 17, 2013, the disclosures of which are incorporated by reference.

TECHNICAL FIELD

This disclosure relates in general to mechanisms for storing and transporting packages, parcels and other objects in a delivery vehicle, and, in particular, but not by way of limitation, to an improved load panel, hinge and railing which provides for improved structural strength, durability and functionality.

BACKGROUND

In the package/parcel shipping and distribution industry, trucks, trailers and other vehicles are some of the primary mechanisms used to transport goods. In order to cost-effectively transport goods using such vehicles, the volume of the truck and/or trailer is often filed to the maximum extent possible. Unfortunately, filling the volume of a truck and/or trailer to a maximum capacity often results in disorganized packing and damage to packages, as well as creating difficulties while loading and unloading packages.

To facilitate more efficient loading and unloading, as well as to provide for more organized and safe transport of goods, trailers and/or trucks are sometime equipped with organizational systems to subdivide the truck/trailer. Unfortunately, many of these organizational systems are ineffective and/or require frequent maintenance and repair.

SUMMARY

In a first aspect, there is provided a system that provides for improved storing and transporting of packages, parcels and other objects, for example, in a delivery vehicle and/or trailer. In some embodiments, the system also provides for improved structural strength, durability and functionality. The system may include a hinge member and a hinge body that are coupled together by openings in the hinge member and the hinge body so that the hinge body can pivot with respect to the hinge member. The hinge body includes a first protrusion and a second protrusion that extends from the first protrusion so that the hinge body can be slideably coupled to a railing of a package deliver vehicle. The first and second protrusions are slideable within a key structure that extends at least partway along a longitudinal axis of an edge railing of the package delivery vehicle.

In some embodiments, the second opening is pivotally coupled to the first opening by a rod.

In other embodiments, the system includes a biasing mechanism to produce a biasing force between the hinge member and the hinge body.

In another embodiment, the second opening is pivotally coupled to the first opening by a rod and the biasing mechanism is a torsion spring that at least partially surrounds the rod.

In still another embodiment, the system includes two second protrusions that extend from the first protrusion at right angles.

In some embodiments, the system includes a first hinge member, a second hinge member, a first hinge body and a second hinge body, and the first and second hinge members are located between the first and second hinge bodies.

In another embodiment, the first and second hinge members are pivotally coupled to the first and second hinge bodies by a rod that passes through the first openings of the first and second hinge members and the second openings of the first and second hinge bodies.

In a second aspect, there is provided a system for use in a package delivery vehicle that includes a panel, a panel hinge member and a hinge body. The panel includes a hinged edge and a free edge located opposite from the hinged edge, and the panel hinge member is coupled to the hinged edge. The hinge body is pivotally coupled to the panel hinge member to allow the panel hinge member and the panel to pivot with respect to the hinge body. The hinge body includes a plurality of protrusions that are coupleable to a key structure that extends at least partway along a longitudinal axis of an edge railing of the package delivery vehicle so that the hinge body and panel are movable along the longitudinal axis of the edge railing.

In some embodiments, the panel and the panel hinge member are a unitary piece.

In other embodiments, the panel and the panel hinge member are made of one or more of a thermoplastic material, a thermoset material and an epoxy material.

In another embodiment, more than one panel hinge member is coupled to the hinged edge of the panel and the system includes a corresponding number of hinge bodies.

In a third aspect, there is provided a system for use in a package delivery vehicle that includes a panel, a panel hinge member, a hinge body and an edge railing. The panel includes a hinged edge and a free edge, and the panel hinge member is coupled to the hinged edge of the panel. The hinge body is pivotally coupled to the panel hinge member to allow the panel to pivot between a stored position and a load bearing position. The edge railing is coupled to the hinge body and the edge railing includes a seat member that extends along at least part of a longitudinal axis of the edge railing. The seat member contacts a bottom surface of the panel when the panel is in the load bearing position and may support some of the weight of the panel and any object that is placed on top of the panel.

In some embodiments, the edge railing is a pre-existing railing of the package delivery vehicle.

In another embodiment, the hinge body is coupled to the edge railing by one or more mechanical fasteners.

In yet another embodiment, the hinge body includes a first key structure and the edge railing includes a second key structure extending along at least part of the longitudinal axis of the edge railing. The first key structure is located within the second key structure to allow the hinge body and panel to move along the longitudinal axis of the edge railing.

In other embodiments, the first key structure includes a first protrusion and a second protrusion that extends from the first protrusion. The second key structure includes a main channel and a secondary channel that extend along the longitudinal axis of the edge railing and are shaped to slideably receive the first protrusion and the second protrusion of the first key structure.

In some embodiments, the second key structure includes a cutout portion to allow the first key structure to be removed from the second key structure.

In still other embodiments, the second key structure includes an undercut portion to receive a set screw to secure the hinge body in place with respect to the edge railing.

In another embodiment, the edge railing includes a first vertical flange member and a second vertical flange member extending in a direction opposite of the first vertical flange member. The seat member of the edge railing extends approximately perpendicularly from the first vertical flange member and the second vertical flange member.

In some embodiments, the panel hinge member includes a first key structure that is coupleable to a corresponding second key structure on the hinged edge of the panel.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE FIGURES

The accompanying drawings facilitate an understanding of the various embodiments.

DETAILED DESCRIPTION

Figure 1:
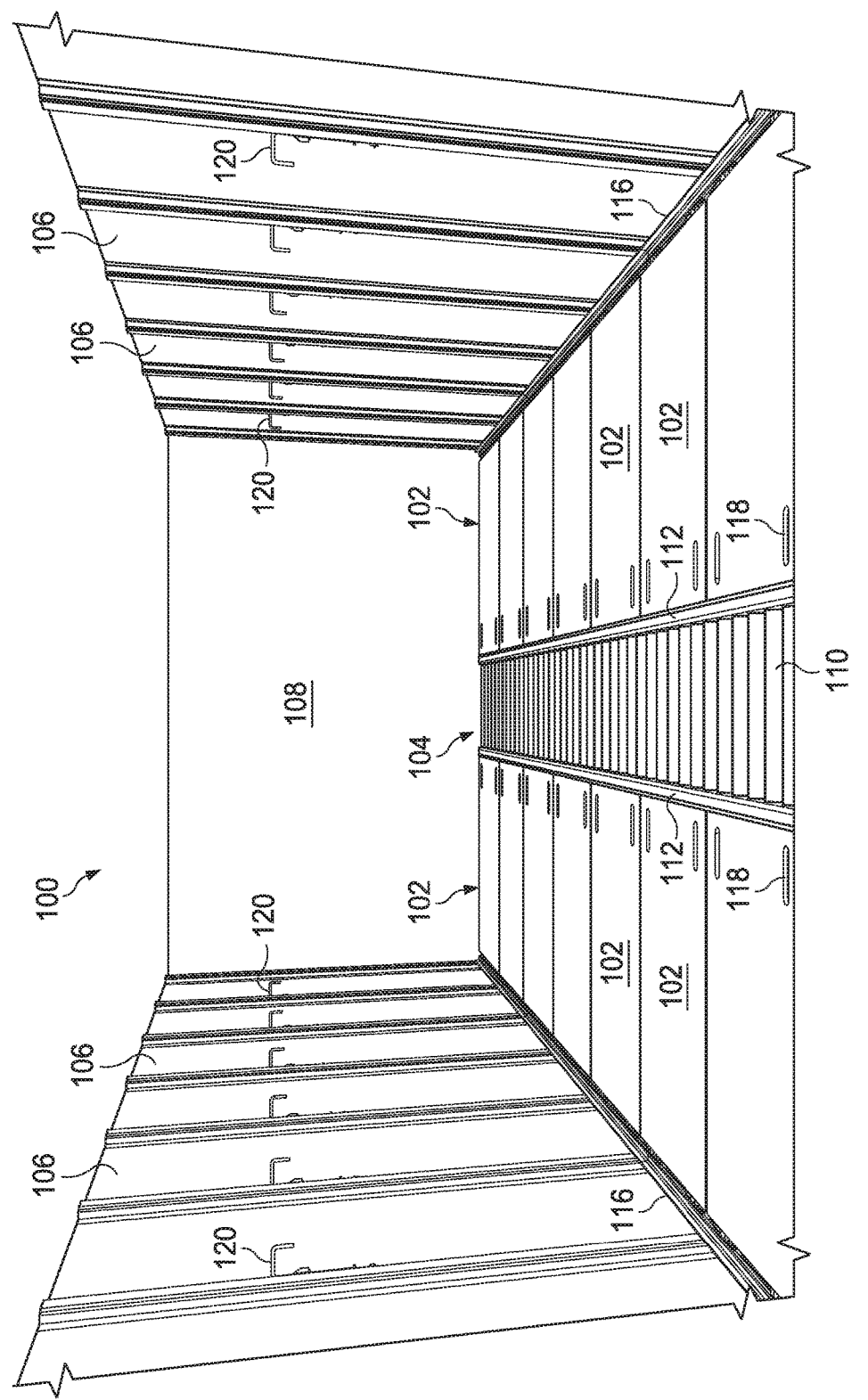
FIG. 1 is a perspective view of an exemplary package delivery vehicle including a roller conveyor assembly and a plurality of panels in the load bearing position.

FIG. 1 is a perspective view of an exemplary package delivery vehicle 100 including a plurality of panels 102 and a roller conveyor assembly 104. The vehicle 100 may be a trailer vehicle, a panel van type vehicle, a container vehicle, or any other vehicle suitable for carrying packages, parcels or other objects. The vehicle 100 includes side walls 106 and a rear wall 108. Not shown is a front wall generally formed by or including one or more latchable doors. Extending along the length of the vehicle 100 in a position generally centered between the side walls 106 is a roller conveyor assembly 104. The roller conveyor assembly 104 is generally a non-motorized system formed by a plurality of freely rotating rollers 110 supported at either end by a pair of opposed side rails 112. The vehicle 100 further includes a floor 124 (not shown, see FIG. 2). The roller conveyor assembly 104 is supported by a support frame system in an elevated position above the vehicle floor 124.

With continued reference to FIG. 1, the vehicle 100 further includes a set of panels 102 which extend between the side wall 106 and the side rail 112 on either side of the roller conveyor assembly 104. To support the panels 102 at each side wall 106 in a same elevated position as the rollers 110, each side wall 106 is fitted with an edge railing 116. Thus, each panel 102 is suspended between the edge railing 116 and the side rail 112 when in the load bearing position, as shown in FIG. 1. Although not shown in FIG. 1, but shown in FIG. 2, the edge of each load panel 102 is pivotally connected to the edge railing 116. This permits the panels 102 to be moved between a load bearing position, as shown in FIG. 1, and a stored position adjacent the side walls 106 of the vehicle 100, as shown in FIG. 2.

Each panel 102 may include one or more finger openings 118 to permit an operator to grab the load panel 102 near the free edge of the panel 102 at the side rail 112 and raise the panel 102 to the stored position adjacent the side walls 106 of the vehicle 100. As will be discussed in more detail below, the load panels 102 may also be biased toward the stored position by one or more biasing elements, such as springs coupled to the panels 102. In some embodiments, a clip mechanism 120 is also provided on the side walls 106 of the vehicle 100 to retain the load panels 102 in the stored position. Of course, other securing mechanisms in addition to clip mechanisms 120 or besides clip mechanisms 120 may be used to hold the panels 102 in the stored position.

Figure 2:
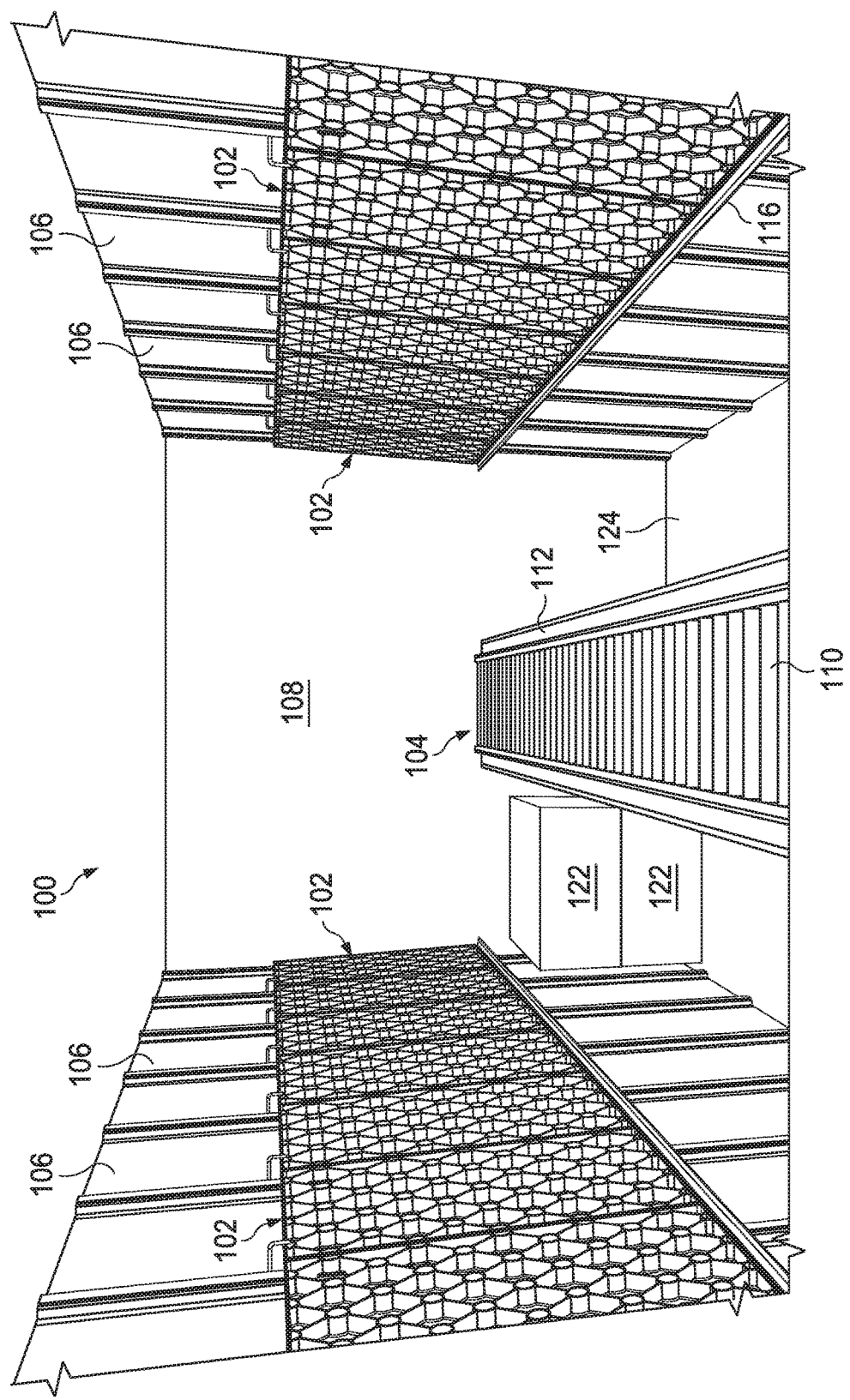
FIG. 2 is a perspective view of the exemplary package delivery vehicle of FIG. 1 in which the panels are in the stored position.

FIG. 2 is a perspective view of the exemplary package delivery vehicle 100 of FIG. 1 in which the panels 102 are in the stored position. As depicted in FIG. 2, packages 122 and other objects can be stored below the panels 102 while the panels 102 are in the stored position. The stored position permits access to the floor 124 of the vehicle 100 allowing for the storage of packages 122 and/or parcels below the level of the panels 102 (when in the load bearing position) and the conveyor assembly 104. Then, the panels 102 can be moved to the load bearing position and further packages 122 or other objects can be placed on top of the panels 102.

Figure 3:
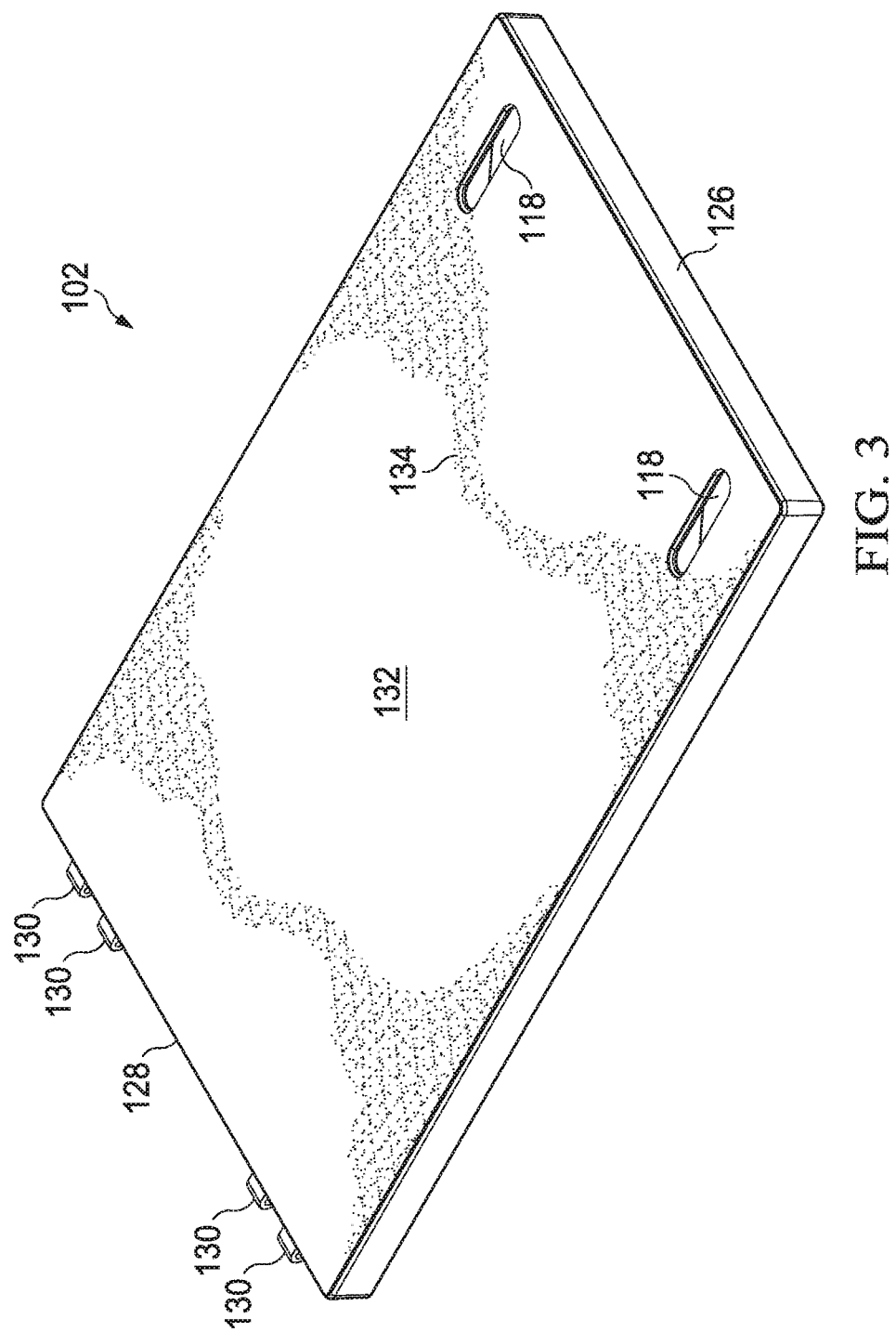
FIG. 3 is a perspective view of an exemplary embodiment of a panel.

FIG. 3 is a perspective view of an embodiment of a panel 102. The panel 102 is rectangular in shape and includes two finger openings 118 near a proximal end 126 of the panel 102. The panel 102 also includes two panel hinge members 130 at the distal end 128 of the panel 102 which are rotatably coupleable to hinge bodies (not shown), as will be explained in more detail below. A top surface 132 of the panel 102 may include an anti-skid texture 134 to increase the frictional coefficient of the top surface 132. In some embodiments, an anti-skid material (not shown) may be applied to or incorporated into the top surface 132 of the panel 102, for example, by using one or more of a variety of application methods, such as, spraying, gluing, painting, rolling, embedding or overmolding the anti-skid material. In some embodiments, an anti-skid material may be incorporated into the material of the panel 102.

The panel 102 may be made of any suitable material. In some embodiments, for example, the panel 102 is made of a thermoplastic, thermosetting plastic and/or an epoxy. In some embodiments, the panel 102 is reinforced with another material, such as glass or other types of reinforcing fibers, microspheres or other fillers to create the appropriate combination of weight, strength, impact resistance and resilience for a particular application. The panel 102, support structures (not shown) and panel hinge members 130 may be one unitary piece and may be formed by any suitable forming process, such as, for example, liquid casting or injection molding.

Figure 4:
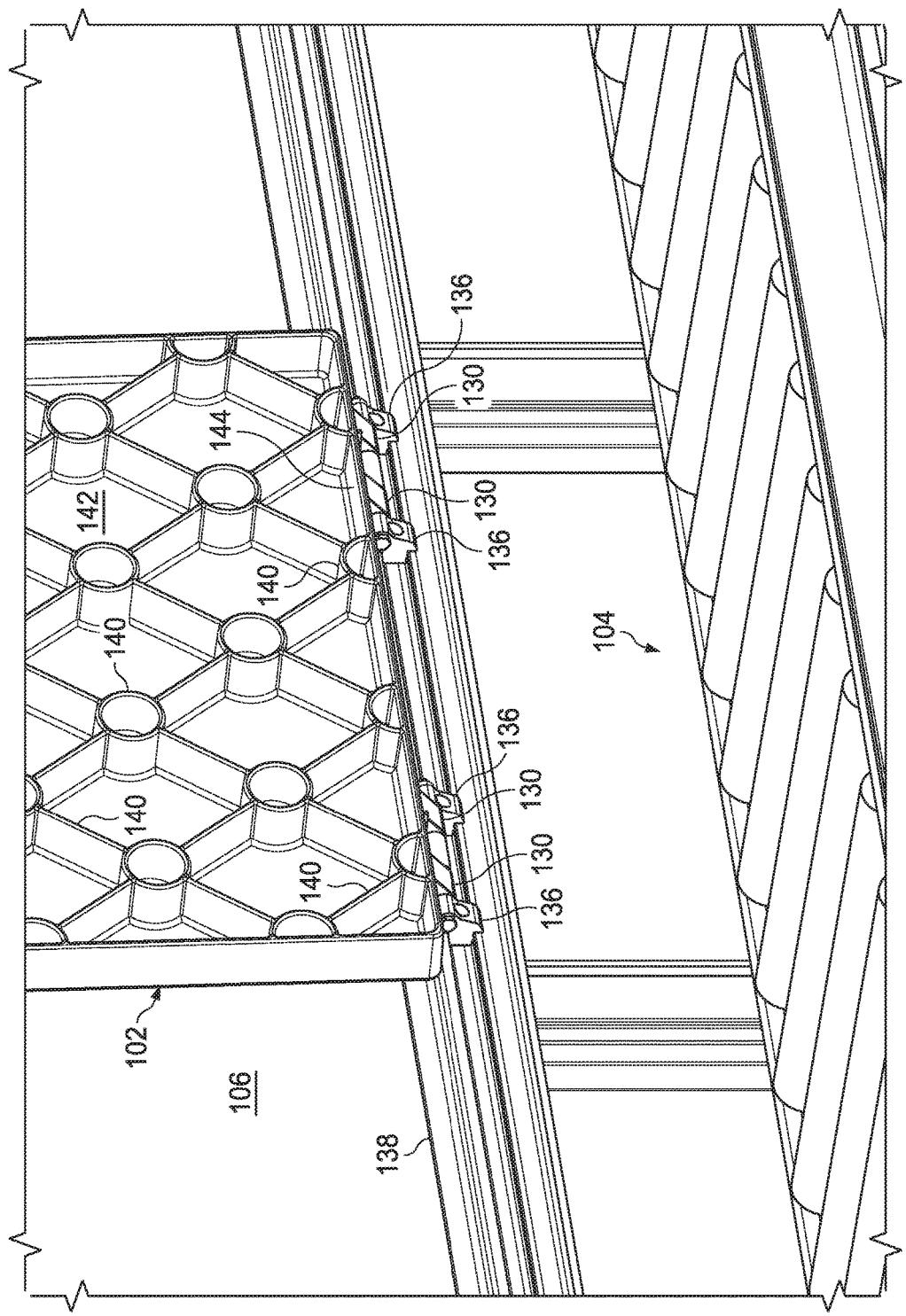
FIG. 4 is a perspective view of a panel, hinge body and railing in which the panel is rotatably coupled to the hinge body and the hinge body is coupled to the railing.

FIG. 4 is a perspective view of a panel 102, a plurality of hinge bodies 136 and a railing 138 in which the panel 102 is rotatably coupled to the hinge bodies 136 and the hinge bodies 136 are slideably coupled to the railing 138. The panel 102 includes a plurality of support structures 140 that form part of the bottom surface 142 of the panel 102. The support structures 140 may provide increased structural strength to the panel 102 while allowing the panel 102 to be light weight. Any suitable number and pattern of support structures 140 may be used. For example, the support structures 140 may be in the form of a plurality of hollow cylindrical hub ribs and a plurality of spoke ribs. Multiple spoke ribs extend from each hub rib. A first end of a spoke rib is connected to one cylindrical hub rib and a second end of the spoke rib is connected to an adjacent cylindrical hub rib.

The panel hinge members 130 are coupled to a peripheral support structure 144 that extends near a perimeter of the panel 102. The peripheral support structure 144 may, as shown in FIG. 4, extend along the entire perimeter of the panel 102. The panel hinge members 130 extend from the peripheral support structure 144 away from the panel 102 along an edge of the panel 102 that is located adjacent to the railing 138. The panel 102 may include any suitable number of panel hinge members 130. In the embodiment shown in FIG. 4, for example, the panel 102 includes four panel hinge members 130. In some embodiments, the panel hinge members 130 are integrally formed with the panel 102. In other embodiments, the panel hinge members 130 are attached to the panel 102.

Figure 5:
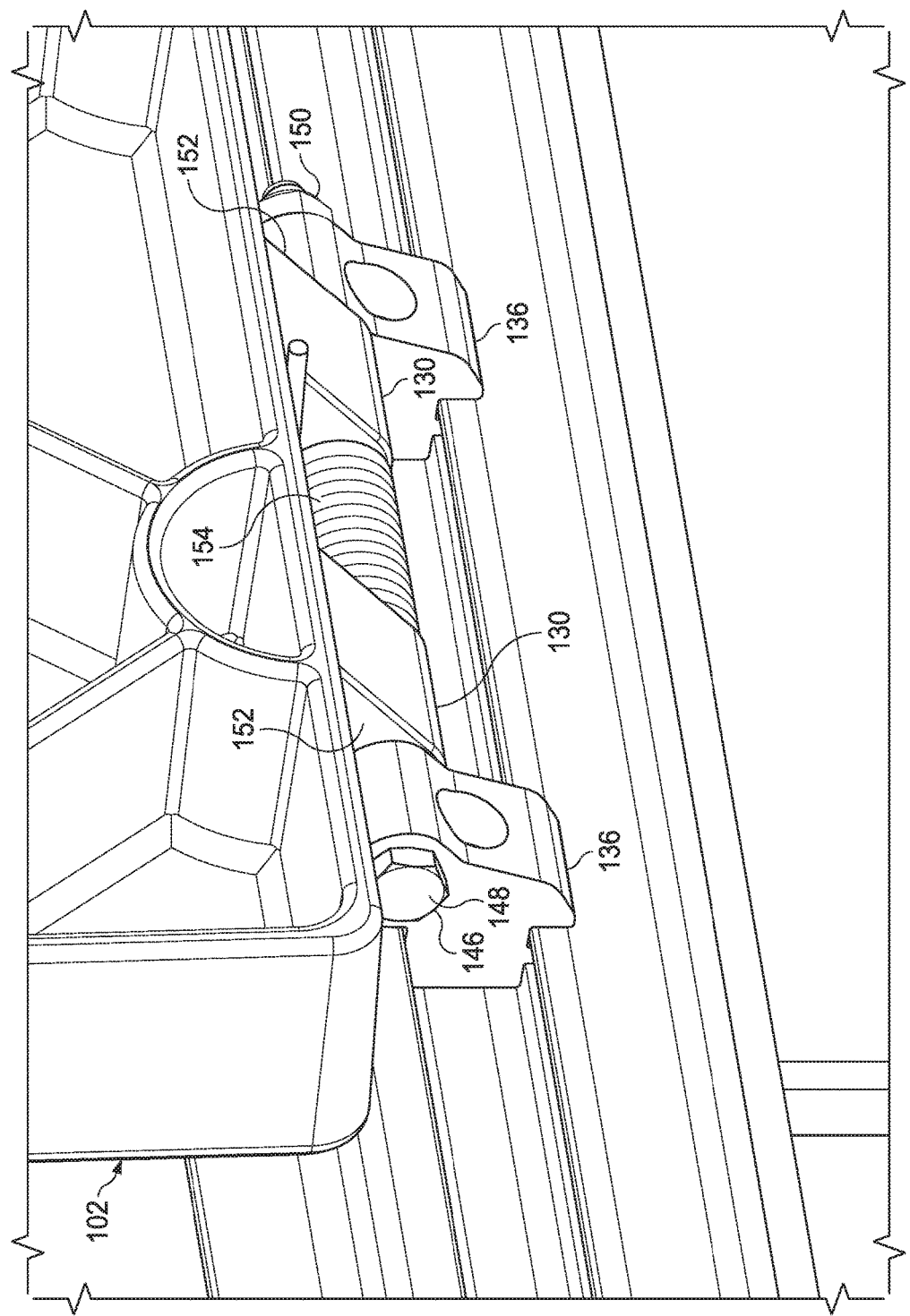
FIG. 5 is a close up view of the hinge body of FIG. 4.

FIG. 5 is a close up view of two of the panel hinge members 130 and two of the hinge bodies 136 of FIG. 4. The panel hinge members 130 are rotatably coupled to the hinge bodies 136 by a rod 146 that extends through openings (not shown) in the panel hinge members 130 and the hinge bodies 136. The hinge bodies 136 are located on the outer edges of the panel hinge members 130 so that both of the panel hinge members 130 are located between the hinge bodies 136. In other embodiments, the hinge bodies 136 may be located at other positions with respect to the panel hinge members 130. For example, in some embodiments the hinge bodies 136 are located between the panel hinge members 130. While two panel hinge members 130 and two hinge bodies 136 are shown in FIG. 5, any number of panel hinge members 130 and hinge bodies 136 may be grouped together and any number of groups of panel hinge members 130 and hinge bodies 136 may be used to couple the panel 102 to the edge railing 116. For example, in some embodiments, the hinge bodies 136 and the panel hinge members 130 are grouped such that two hinge bodies 136 correspond to a single panel hinge member 130.

The rod 146, which may be, for example, a bolt and nut, passes through aligned openings made in the panel hinge members 130 and the hinge bodies 136 and may hold the hinge bodies 136 in place with respect to the panel hinge members 130 by applying an inward force from a head 148 of the rod 146 and a threaded nut 150 coupled to the rod 146. The panel hinge members 130 may have sloped side walls 152 to provide structural strength to the panel hinge members 130.

The embodiment shown in FIG. 5 also includes a biasing mechanism 154, which in the embodiment of FIG. 5 is a torsion spring, located between the panel hinge members 130 and surrounding the rod 146. As described above, the biasing mechanism 154 may provide a biasing force to hold the panel 102 in the stored position. In some embodiments, the biasing mechanism 154 is strong enough to hold the panel 102 in the stored position once the panel 102 has been moved to within 5-10 degrees of the stored position, but is not sufficiently strong to move the panel 102 when the panel 102 is in the load bearing position.

Figure 6:
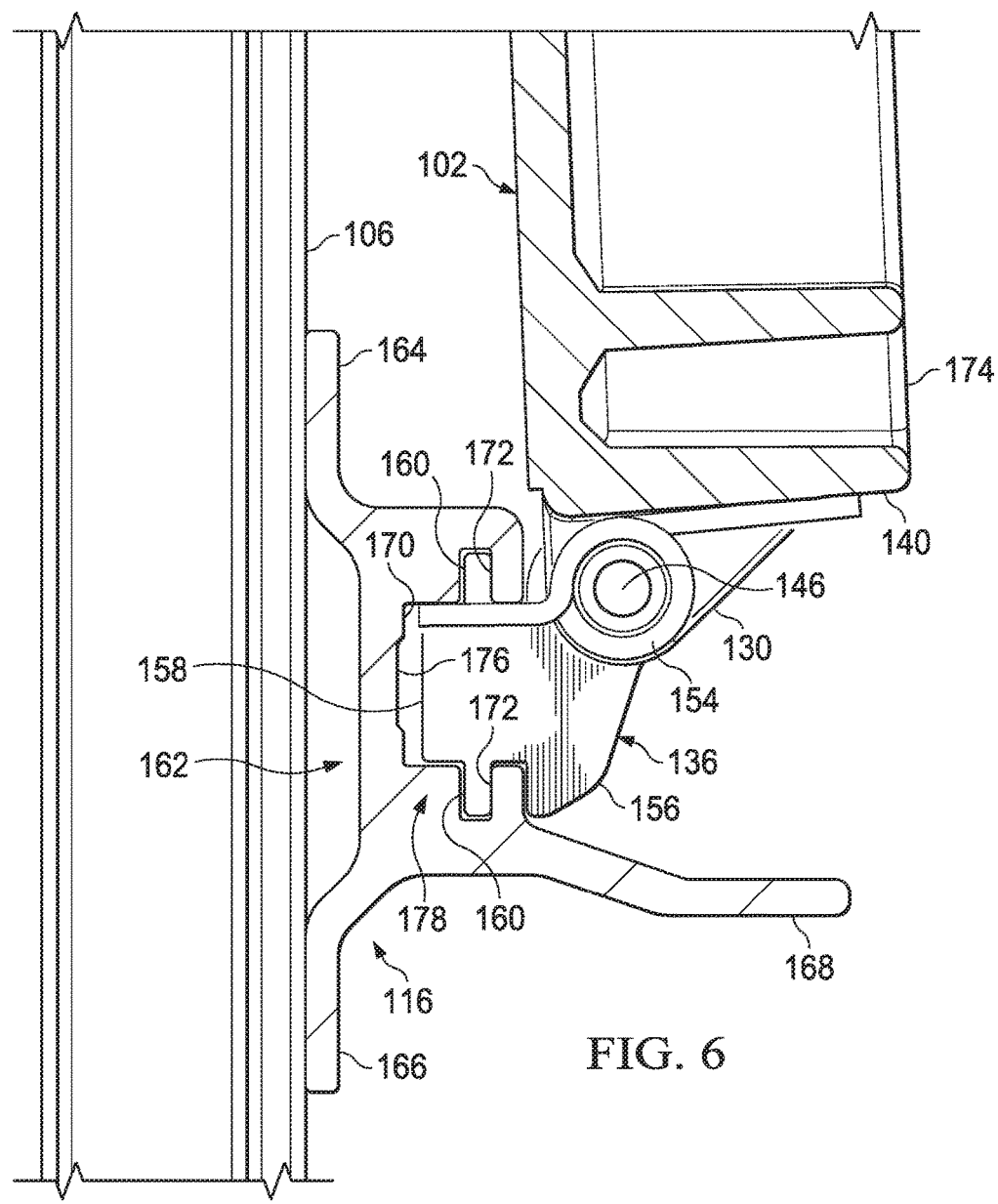
FIG. 6 is a cutaway side view of a panel, hinge body and railing in which the panel is rotatably coupled to the hinge body and the hinge body is coupled to the railing.

FIG. 6 is a cutaway side view of a panel 102, a panel hinge member 130 that forms part of a panel 102, a hinge body 136, a biasing mechanism 154 and an edge railing 116 in which the panel hinge member 130 is rotatably coupled to the hinge body 136 and the hinge body 136 is slideably coupled to the edge railing 116. The hinge body 136 includes a main body portion 156, a first projection member 158 extending away from the main body portion 156 and at least one projection member 160 extending from the first projection member 158. In the embodiment shown in FIG. 6, for example, the hinge body 136 includes two second projection members 160: a top second projection member 160 that extends in an opposite direction from a bottom second projection member 160. While the first projection member 158 and second projection members 160 are in a "T" shape in the embodiment shown in FIG. 6, other configurations of the first projection member 158 and the second projection members 160 are possible that allow the hinge body 136 to be slideably secured within the edge railing 116. For example, in some embodiments the hinge body 136 may include only the top second projection member 160. In other embodiments, the second projection members 160 extend at angles other than 90 degrees from the first projection member 158. In other embodiments, the hinge body 136 may include a plurality of first projection members 158 that each includes one or more second projection members 160. The first projection member 158 and the second projection members 160 extend the length of the hinge body 136.

As discussed above, the hinge body 136 may also include an opening (not shown) to receive the rod 146 to hold the hinge body 136 to the panel hinge members 130. In other embodiments, other mechanisms may be used to pivotally couple the hinge body 136 to the panel hinge member 130, such as, for example, snap-in-place features.

The edge railing 116 includes a main body portion 162, a first vertical flange member 164, a second vertical flange member 166, a seat member 168, a main channel 170 and at least one secondary channel 172 that each extend along the length of the edge railing 116. The first vertical flange member 164 and the second vertical flange member 166 extend in opposite directions from the main body portion 162 and are secured to the side wall 106 of a delivery vehicle. The seat member 168 extends from the main body portion 162 in a generally perpendicular direction compared with the location of the first vertical flange member 164 and the second vertical flange member 166. When the panel 102 is in the load bearing position, a bottom edge 174 of one or more of the support structures 140 contacts the seat member 168 to support at least part of the weight of the panel 102 and any objects on top of the panel 102. As explained above, an opposite side of the panel 102 contacts the conveyor assembly 104 so that at least a portion of the weight of the panel 102, along with the weight of any packages or other object on the panel 102, is supported by the seat member 168 of the edge railing 116 and the conveyor assembly 104.

The main body portion 162 includes a main channel 170 and secondary channels 172 that extend from the main channel 170 to create a key structure 178. The top secondary channel 172 extends in an opposite direction from the bottom secondary channel 172 so that the position of the secondary channels 172 corresponds to the position of the second projection members 160 of the hinge body 136. The secondary channels 172 may extend from the main channel 170 in any suitable direction that corresponds to the second projection members 160. As was the case for the first projection member 158 and second projection member 160 of the hinge body 136, the edge railing 116 may include any number and configuration of main channels 170 and secondary channels 172 to allow the hinge body to be slideably coupled to the edge railing 116.

The main channel 170 includes an undercut portion 176 that extends along the length of the edge railing 116. The main channel 170 and secondary channels 172 act as slots to slideably receive and hold the first projection member 158 and the second projection members 160 and the undercut portion 176 is positioned to receive a set screw (see, for example, the set screw 186 in FIG. 7 or the set screw 428 in FIG. 14) that can be tightened to hold the hinge body 136 in place with respect to the edge railing 116. As such, the hinge body 136 is slideably coupled to the edge railing 116 and is movable within the edge railing 116 along a lateral axis of the railing 116, which extends perpendicularly to the page in FIG. 6, until a set screw, or other securing mechanism, is engaged to hold the hinge body 136 in place with respect to the railing 116.

Figure 7:
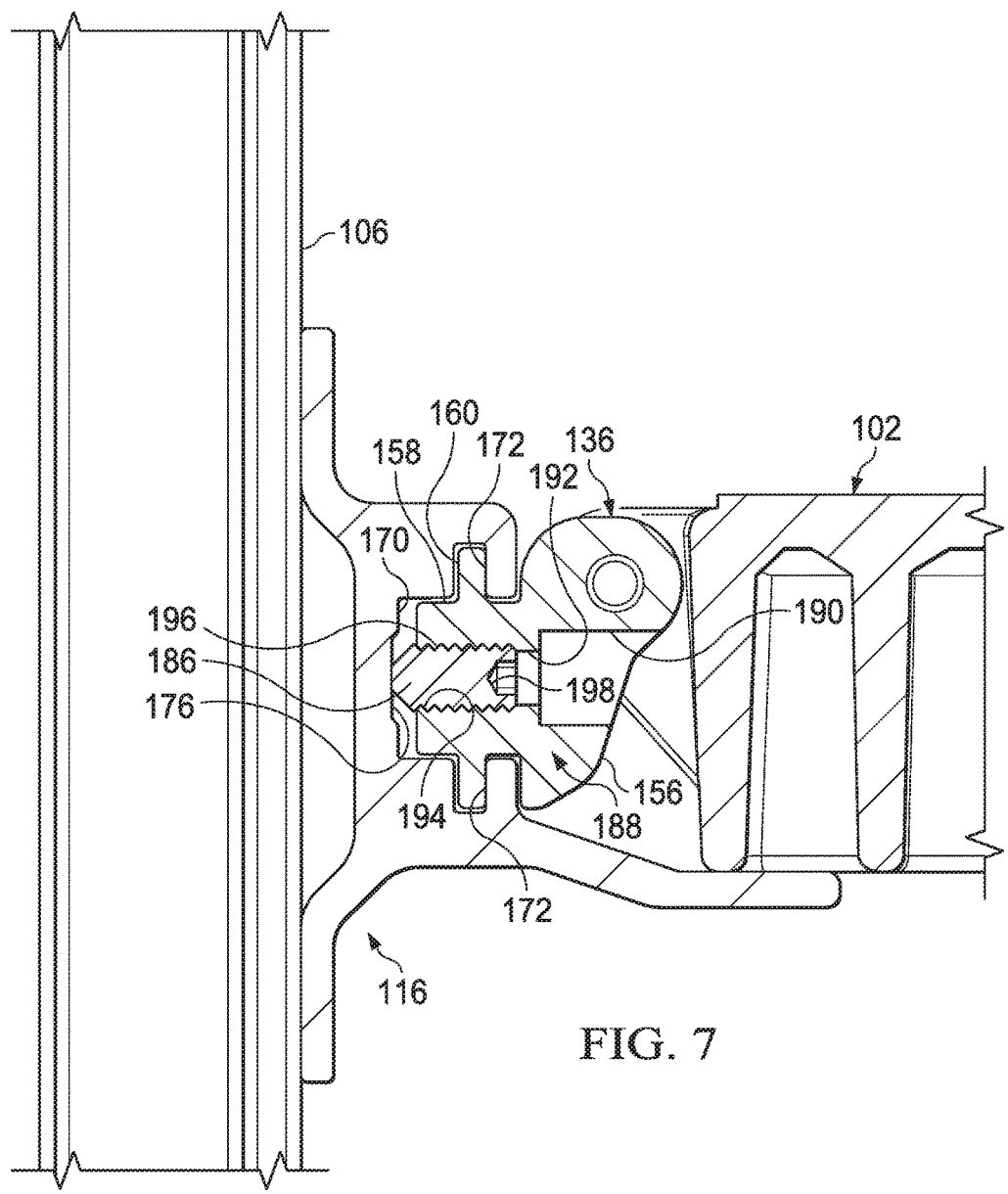
FIG. 7 is a cutaway side view of a panel, hinge body and railing in which the hinge body includes a set screw.

FIG. 7 is a cutaway side view of a panel 102, hinge body 136 and edge railing 116 in which the hinge body 136 includes a set screw 186. As discussed above, the first projection 158 and second projections 160 of the hinge body 136 are slideable within the main channel 170 and secondary channels 172 of the edge railing 116 until secured in place by a securing mechanism. In some embodiments, the securing mechanism is a set screw 186. In the embodiment shown in FIG. 7, for example, the hinge body 136 includes a lateral opening 188 that extends from the main body portion 156 of the hinge body 136 through the first projection member 158. The lateral opening 188 includes a first, large-diameter portion 190, an intermediate portion 192, and a second, threaded portion 194. The set screw 186 is located in the lateral opening 188 so that a threaded portion 196 of the set screw 186 interacts with the second, threaded portion 194 of the lateral opening 188. The set screw 186 may include a hexagonal interface 198 to allow for easy tightening and loosening of the set screw 186. When tightened, the set screw 186 contacts the undercut portion 176 of the main channel 170 to hold the hinge body 136 in place with respect to the edge railing 116. As shown in FIG. 7, the set screw 186 may penetrate into the material of the edge railing 116 at the undercut portion 176 and, in some instances, may dent or otherwise deform the material of the undercut portion 176. Because the undercut portion 176 is removed laterally from the remainder of the main channel 170, however, there is a lower chance that any such dent or deformation will interfere with the movement of the hinge body 136 with respect to the edge railing 116.

In some embodiments, the set screw 186, the threaded portion 194 and/or other portions of the lateral opening 188 may include vibration reduction elements, such as, for example, a Nylok® Blue® Nylon Torq-Patch® material, made by Nylock of Macomb, Mich. In some embodiments, each panel 102 is coupled to multiple hinge bodies 136 and each hinge body 136 includes a lateral opening 188 and a set screw 186. In other embodiments, each panel 102 include only one hinge body 136 that includes a lateral opening 188 and set screw 186. In other embodiments, each hinge body 136 may include multiple lateral openings 188 and a corresponding number of set screws 186.

Figure 8:
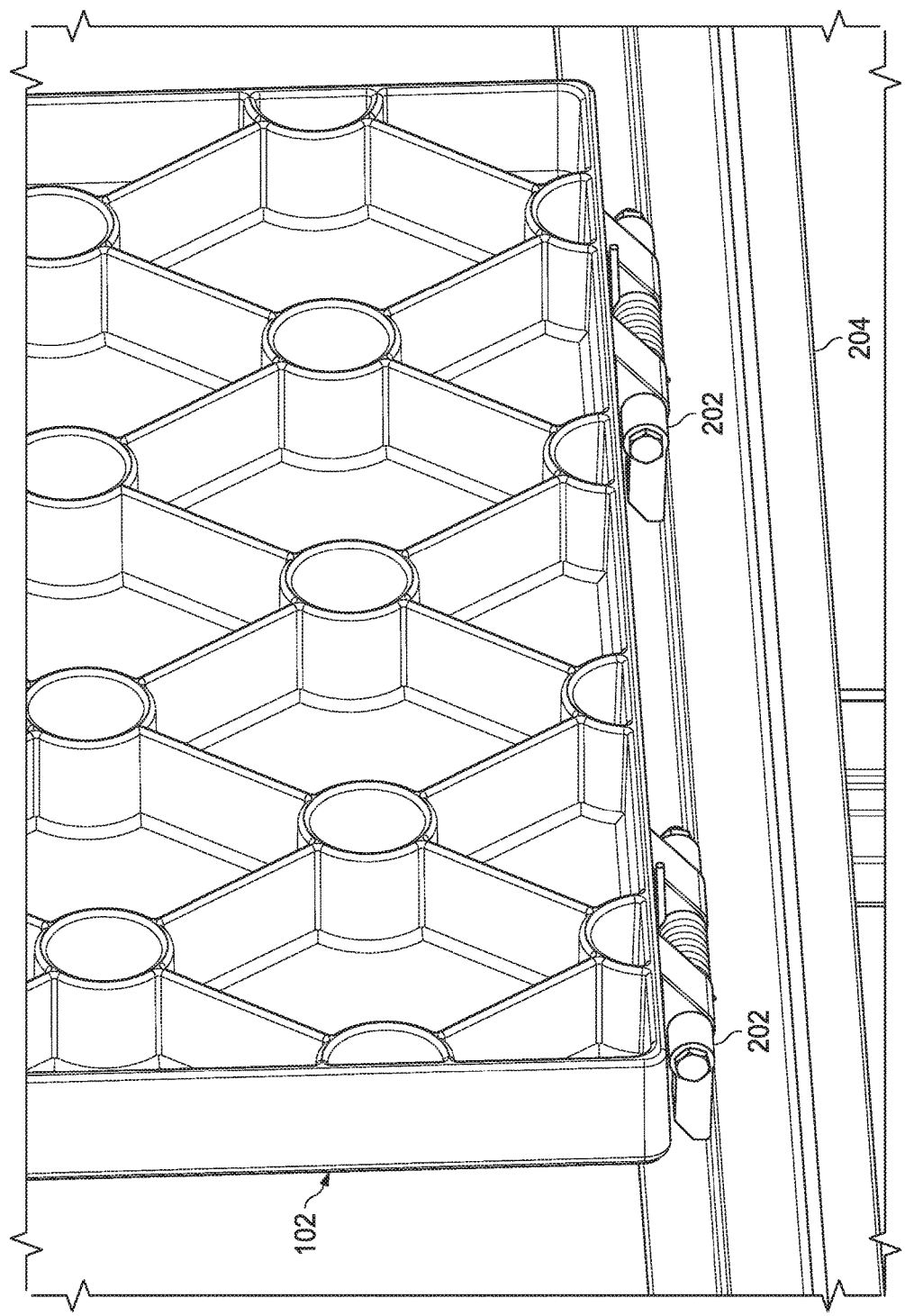
FIG. 8 is a perspective view of a panel, hinge body and railing in which the railing is a pre-existing railing and the hinge body is secured to the pre-existing railing.

FIG. 8 is a perspective view of a panel 102 as described above that is coupled to the modified hinge bodies 202 for securing to a pre-existing railing 204. In some embodiments, it is desired to rotatably secure a panel 102 to a pre-existing railing 204 that may not include a main channel 170 or secondary channels 172. In such embodiments, a modified hinge body 202 may be secured to the pre-existing railing 204 by a suitable mechanical fastener, such as, for example, one or more bolts or another securing mechanism, as described in more detail below.

Figure 9:
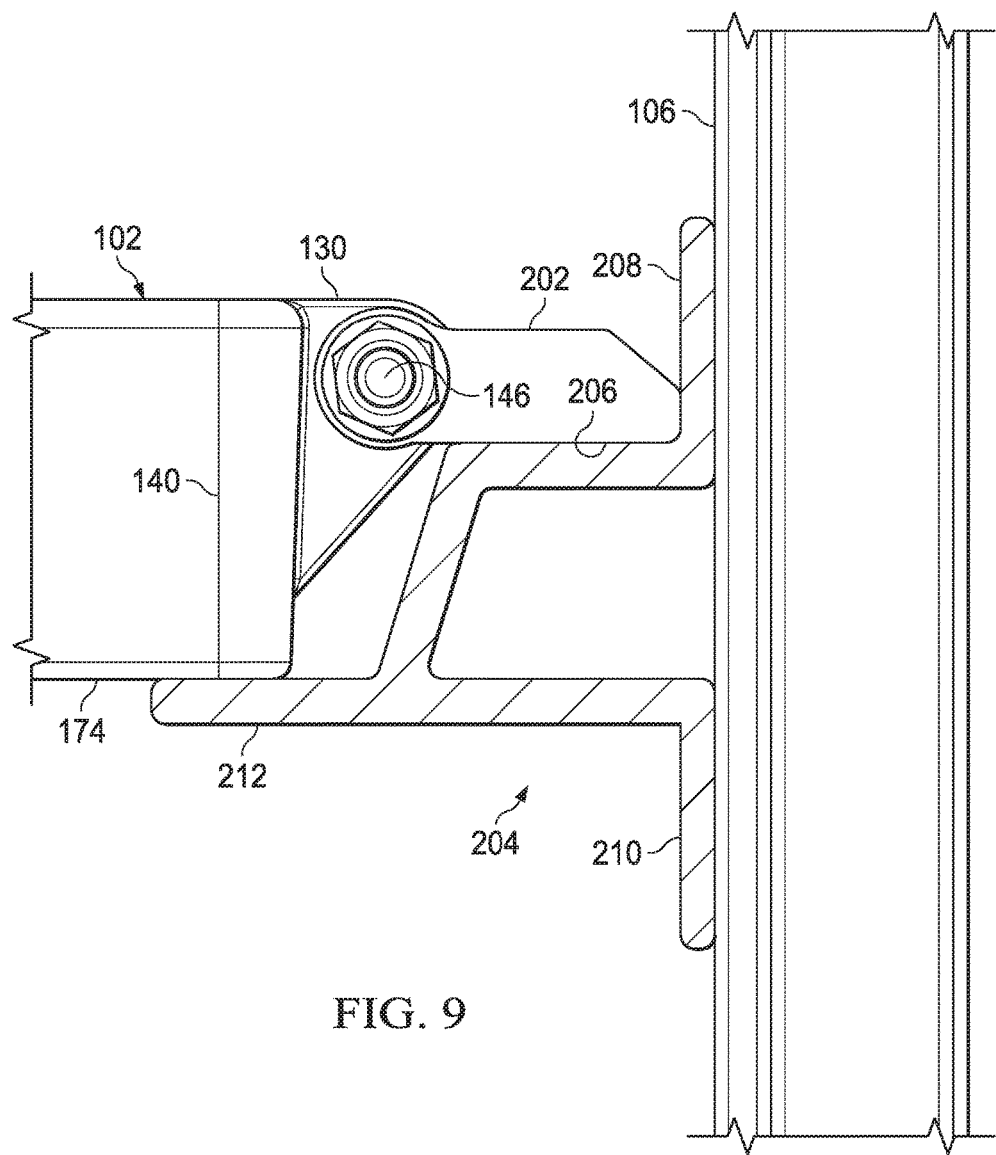
FIG. 9 is a cutaway side view of the panel, hinge body and railing of FIG. 8.

FIG. 9 is a cutaway side view of the panel 102, the modified hinge body 202 and the pre-existing railing 204 of FIG. 8. As shown, the pre-existing railing 204 may be coupled to a side wall 106 of a vehicle. The modified hinge body 202 may include an elongated contact surface 206 that is configured to abut a portion of the per-existing railing 204. The contact surface 206 may be coupled to the pre-existing railing 204 by any suitable mechanism. The modified hinge body 202 may also include an opening (not shown) to receive a rod 146 to hold the modified hinge body 202 to the panel hinge members 130, similar to the hinge body 136. The pre-existing railing 204 may include a first vertical flange member 208, a second vertical flange member 210 and a seat flange 212 that contacts the bottom edge 174 of the support structures 140 when the panel 102 is in the load bearing position, as shown in FIG. 9.

Figure 10:
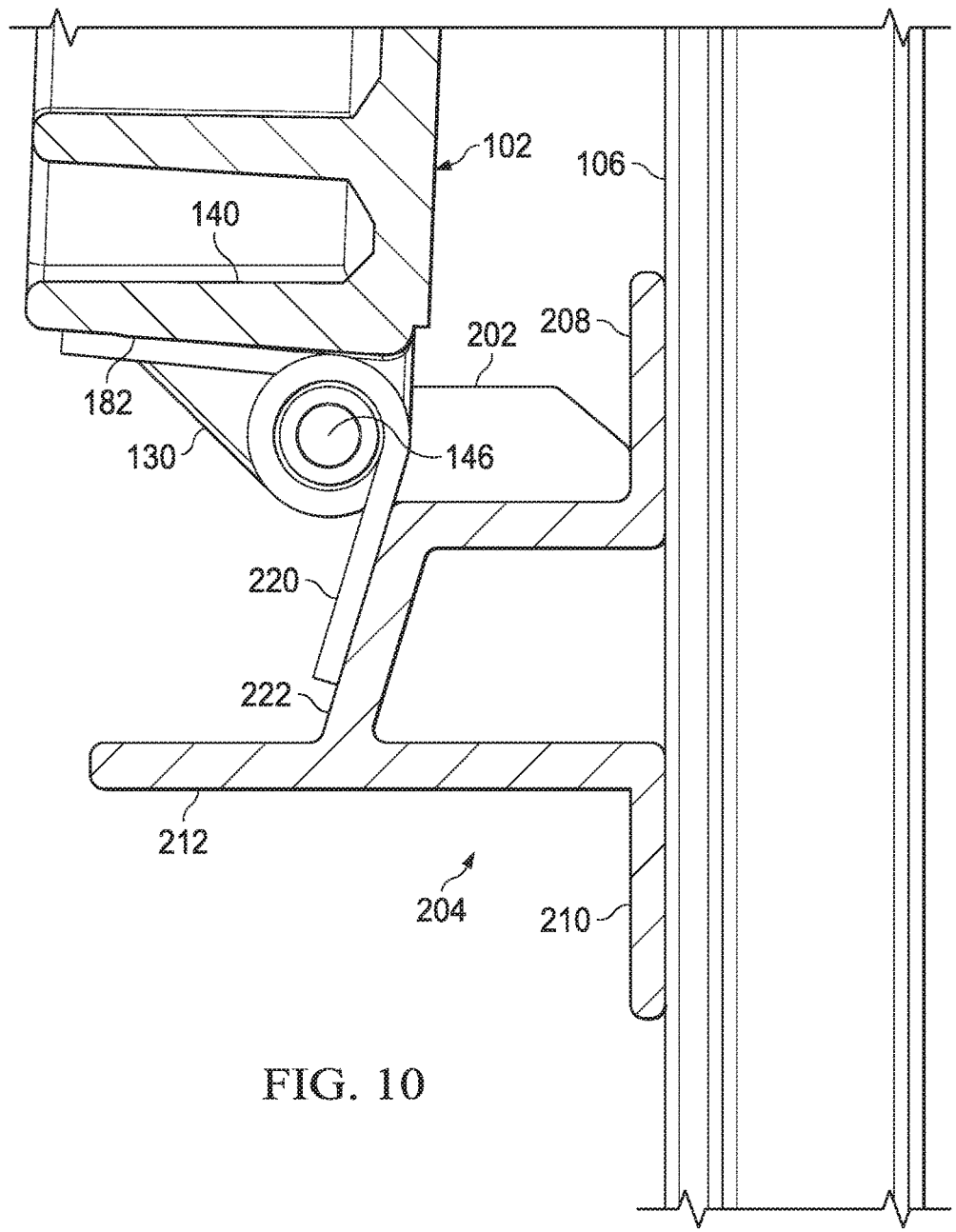
FIG. 10 is a close-up, cutaway side view of a panel, a hinge body, a pre-existing railing and a biasing mechanism.

FIG. 10 is a close-up, cutaway side view of a panel 102, a modified hinge body 202, a pre-existing railing 204 and a biasing mechanism 220. The biasing mechanism 220 may be any suitable biasing mechanism and, in some embodiments, may be a torsion spring. The biasing mechanism 220 may encircle the rod 146 used to hold the modified hinge body 202 to the panel hinge member 130. The biasing mechanism 220 may contact the panel 102 at a surface 182 of a support structure 140 of the panel 102 and may contact the pre-existing railing 204 at a body member 222 of the pre-existing railing 204. As such, the biasing mechanism 220 may store energy when the panel 102 is moved toward the load bearing position and may release energy, or apply an upward-acting force to the panel 102, when the panel 102 is moved toward the stored position. As described above, the biasing mechanism 220 may provide sufficient force to hold the panel 102 in the stored position but may not have sufficient energy to move the panel 102 when the panel 102 is in the load bearing position. Of course, other types of biasing mechanisms may be used to apply a biasing force to the panel 102, such as, for example, other types of springs.

Figure 11:
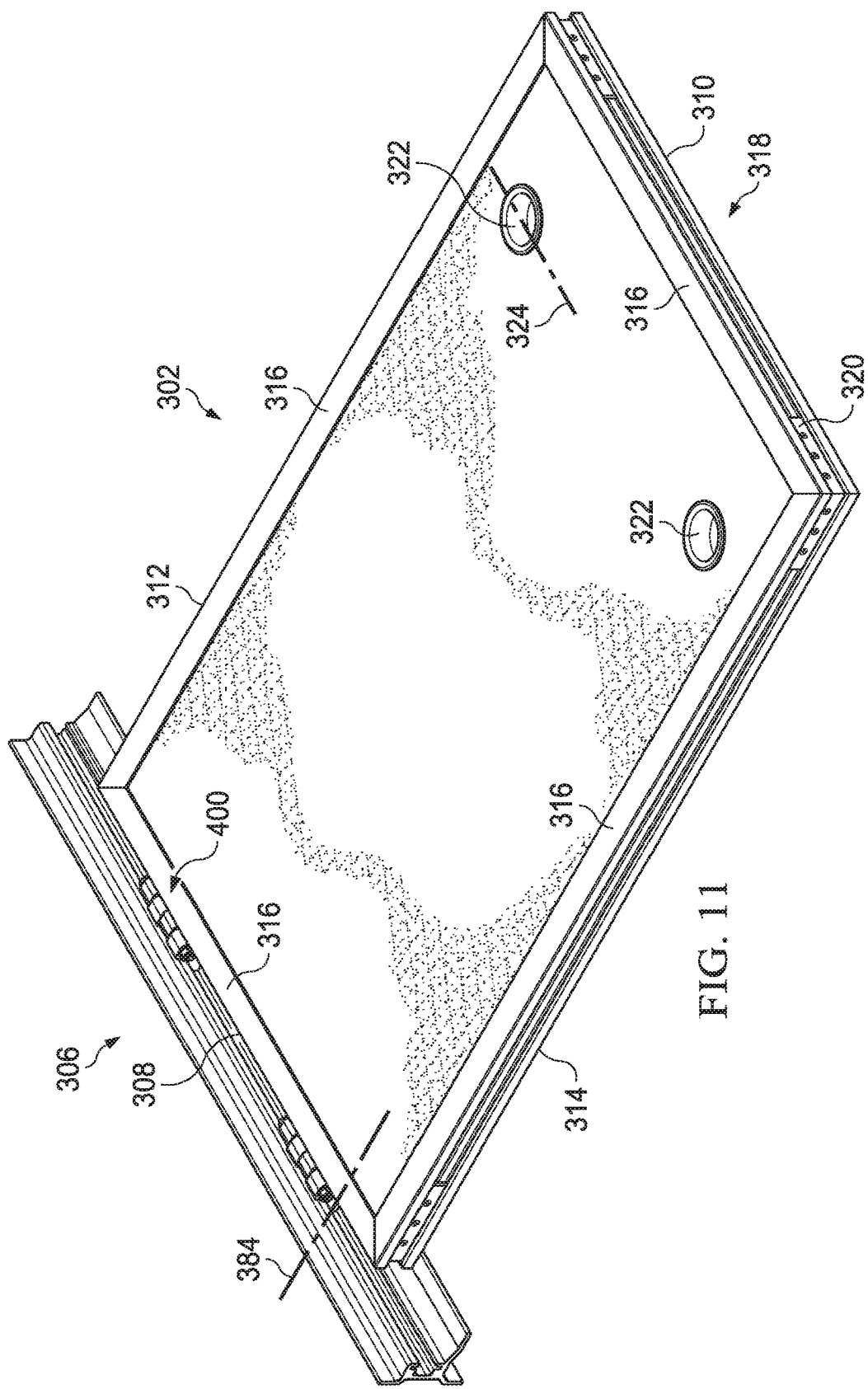
FIG. 11 is a perspective view of another embodiment of a panel, hinge and railing.

FIG. 11 is a perspective view of another embodiment of a panel 302, a hinge 400 and an edge railing 306 in which the panel 302 includes a filler material (not shown). In this embodiment, the panel 302 is generally of rectangular shape and includes a first edge 308 that that is pivotally coupled to the edge railing 306 and an opposed second edge 310 that is supported by the side rail 112 (not shown) of the conveyor assembly 104 when the panel 302 is in the load bearing position. The panel 302 further includes third and fourth edges 312 and 314 perpendicular to the first and second edges 308 and 310. In some embodiments, the first, second, third and fourth edges 308, 310, 312, 314 of the panel 302 are defined by frame rails 316. A 45 degree cut is made in each rail 316 and the rails 316 are aligned with each other so that an L-angle bracket 320 is inserted in the rails 316 to hold the rails 316 together. The panel 302 may also include finger openings 322 located near a free end 318 of the panel 302.

Figure 12:
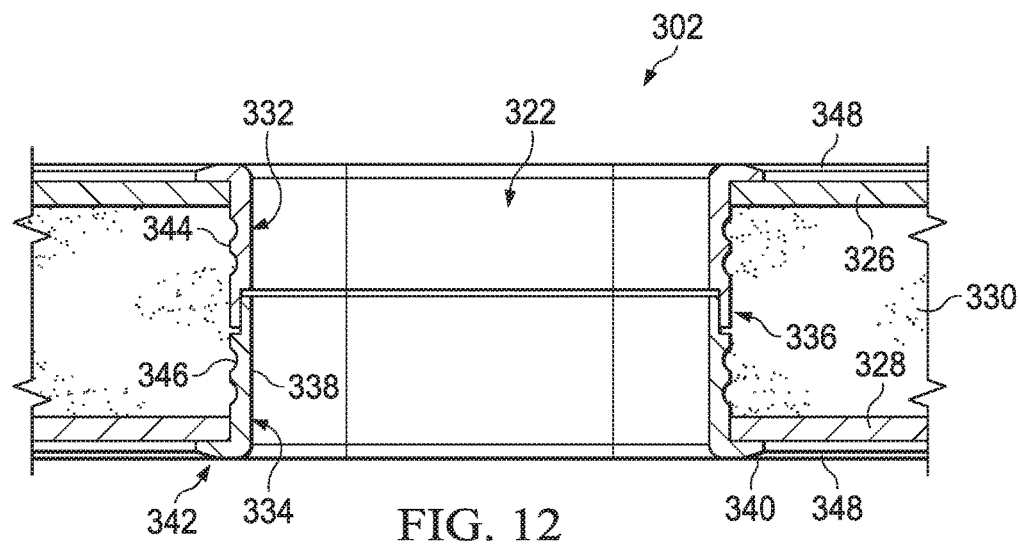
FIG. 12 is a cutaway side view of the panel of FIG. 11 taken along line 324 of FIG. 11.

FIG. 12 is a cutaway side view along line 324 of FIG. 11 showing the finger opening 322 of the panel 302. The panel 302 includes a top surface sheet member 326 and a bottom surface sheet member 328 that are supported by the frame rails 316 (not shown). A filler material 330, such as a foam material, fills the space between the top surface sheet member 326 and the bottom surface sheet member 328.

The finger opening 322 is defined by a pair of interlocking trim rings 332 and 334. Cooperating male/female shoulders 336 are formed in each trim ring 332 and 334, with the shoulders 336 engaging each other so as to interlock the trim rings 332 and 334 and provide a seal. Each trim ring 332 and 334 includes an encircling side wall 338, with the shoulder 336 formed at a distal edge of the side wall 338. Each trim ring 332 and 334 further includes an encircling lip member 342 extending perpendicularly from the side wall 338 at an edge opposite the distal edge. The encircling lip member 342 further includes a peripheral bevel 340.

The inner surface of the encircling side wall 338 is generally smooth. The outer surface of the encircling side wall 338, however, includes a number of encircling ridges 344 with corresponding encircling valleys 346. The filler material 330 between the top surface sheet member 326 and the bottom surface sheet member 328 is preferably an injected expandable foam of the type known to those skilled in the art. The ridges 344 and valleys 346 form a locking retention structure which engages with the filler material 330 so as to retain the trim rings 332 and 334 in the panel 302. The engaged shoulders 336 form a sealing structure which inhibits seepage of the filler material 330 into the open inner region of the finger opening 322.

In a preferred embodiment, both the top surface sheet member 326 and the bottom surface sheet member 328 are covered by a protective coating 348. The coating 348 is preferably a spray-on anti-skid coating having a thickness no greater than the thickness of the encircling lip member 342 and bevel 340 of the trim ring 332 and 334. This minimizes the potential for accidents and keeps all panels 302 level for sliding boxes/packages.

Figure 13:
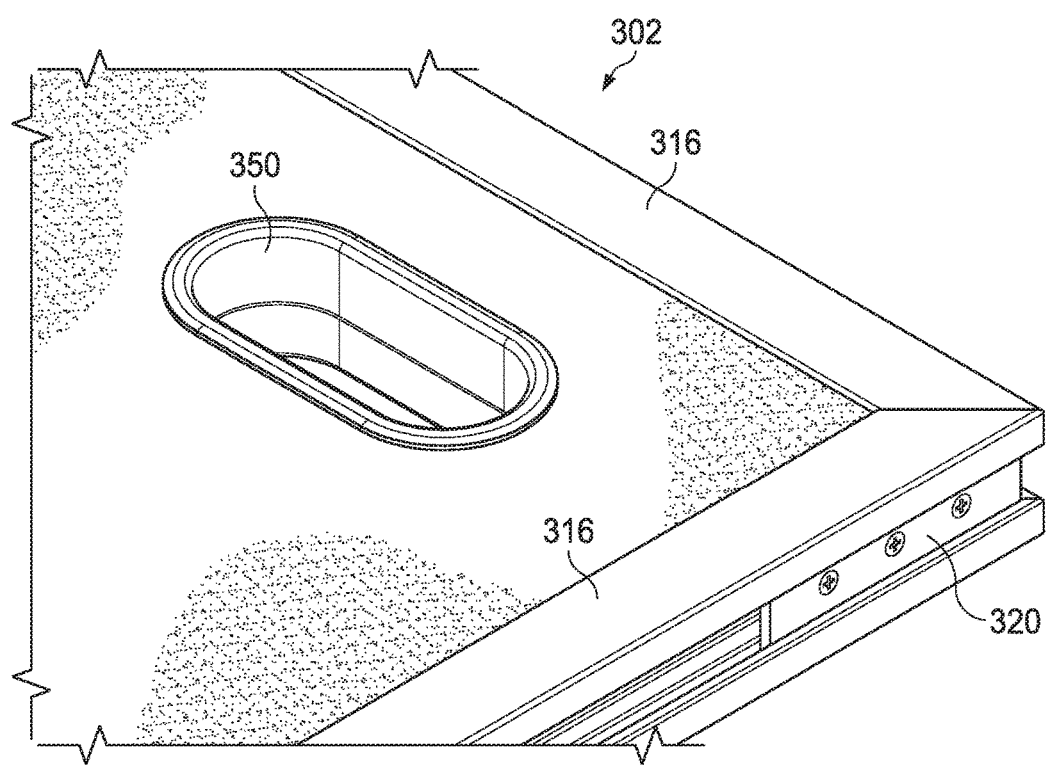
FIG. 13 is a partial perspective view of a panel including a finger opening.

FIG. 13 is a perspective view of another embodiment of a finger opening 350 on a panel 302 that includes a filler material (not shown). The finger opening 350 is oval in shape. It will be understood that the finger openings 350 may be any suitable shape and may be located at any suitable location on the panel 302.

Figure 14:
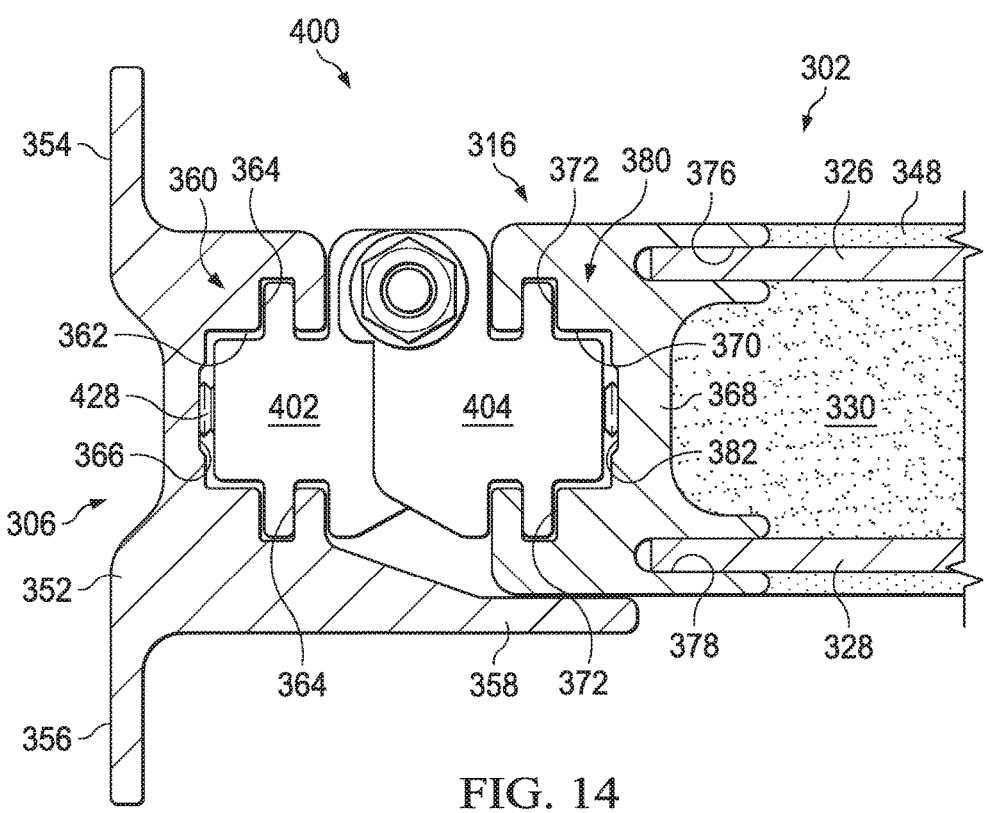
FIG. 14 is a cutaway side view of the panel, hinge and railing of FIG. 11 taken along line 384 of FIG. 11.

FIG. 14 is a cutaway side view of the panel 302, hinge 400 and edge railing 306 of FIG. 11 taken along line 384 of FIG. 11. The edge railing 306 includes a body portion 352, a first vertical flange member 354 extending from the body portion 352, a second vertical flange member 356 extending from the body portion 352 (in an opposite direction of the first vertical flange member 354) and a horizontally extending seat member 358 extending from the body portion 352. The first vertical flange member 354, second vertical flange member 356 and horizontally extending seat member 358 extend along the length of the edge railing 306. The edge railing 306 is preferably an integral structure. In a preferred embodiment, the edge railing 306 is formed as an extruded member (for example, made of aluminum). A key structure 360 is formed in the body portion 352 extending along the length of the edge railing 306. The key structure 360 includes a main channel 362 opening in the horizontal direction and extending along the length of the edge railing 306. The key structure 360 further includes a pair of secondary channels 364 opening from the opposed side walls of the main channel 362 in the vertical and horizontal directions, the secondary channels 364 also extending along the length of the edge railing 306. An undercut channel 366 is formed in the floor of the main channel 362 and extends along the length of the edge railing 306.

The frame rail 316 includes a first horizontal slot 376 and a second horizontal slot 378 which extend along the length of the frame rail 316. The frame rail 316 is preferably an integral structure. In a preferred embodiment, the frame rail 316 is formed as extruded member (for example, made of aluminum). The first and second horizontal slots 376 and 378 are configured to receive and support an edge of the top and bottom surface sheet members 326 and 328, respectively.

A key structure 380 is formed in a body portion 368 of the frame rail 316 extending along the length of the frame rail 316. The key structure 380 includes a main channel 370 opening in the horizontal direction and extending along the length of the frame rail 316. The main channel 370 includes opposed side walls and a floor. The key structure 380 further includes a pair of secondary channels 372 opening from the opposed side walls of the main channel 370 in the vertical direction, the secondary channels 372 also extending along the length of the frame rail 316. An undercut channel 382 is formed in the floor of the main channel 370 and extends along the length of the frame rail 316.

It will accordingly be noted that the key structures 360 and 380 are identical to each other. In other embodiments, the key structures 360 and 380 may each be different from each other. When the load panel 302 is lowered into position suspended between the edge railing 116 of the conveyor assembly 104 and the side rail 306, the horizontally extending seat member 358 of the edge railing 306 provides support for the panel 302. In this way the load of the panel 302 is not being carried entirely by the hinge 400.

The hinge 400 is formed by pivotally coupling a first hinge member 402 to a second hinge member 404. The hinge members 402 and 404 are preferably formed of extruded aluminum. Although only one pair of hinge members 402 and 404 is needed per hinge 400, it is preferred to form each hinge 400 from a plurality of hinge member pairs.

Figure 15:
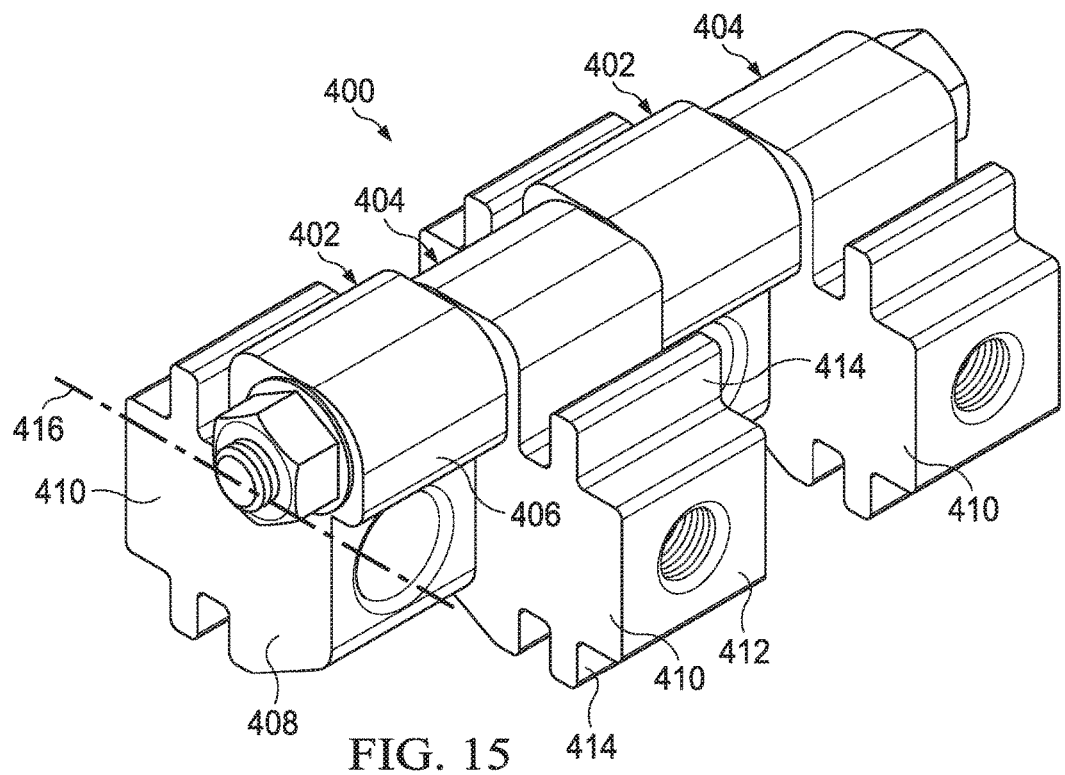
FIG. 15 is a perspective view of the hinge of FIG. 11.

FIG. 15 is a perspective view of the hinge 400 of FIG. 11. Each hinge member 402 and 404 includes a main body portion 406, a hinging body portion 408 extending from the main body portion 406 and an interconnect body portion 410 extending away from the main body portion 406. In the illustrated embodiment, the hinging body portion 408 extends away from the main body portion 406 in a vertical direction and the interconnect body portion 410 extends away from the main body portion 406 in a horizontal direction. The interconnect body portion 410 is sized and shaped as a complement of the size and shape of the key structures 360 and 380. The interconnect body portion 410 accordingly includes a first projection member 412 sized and shaped to fit within the main channels 362 and 370 and a pair of second projection members 414 extending perpendicularly from the first projection member 412 and sized and shaped to fit within the pair of secondary channels 364 and 372. The complementary fit of the interconnect body portion 410 within the key structures 360 and 380 permits a sliding of the hinge 400 along the length of the edge railing 306 and frame rail 316.

Figure 16:
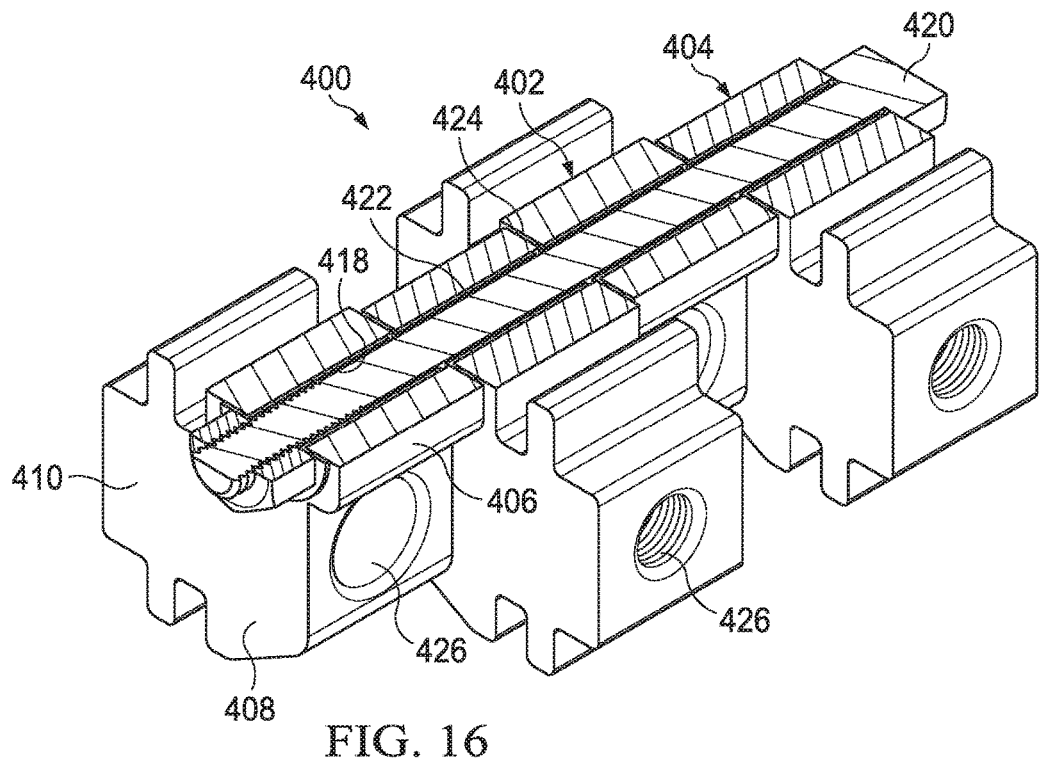
FIG. 16 is a cutaway, perspective view of the hinge of FIG. 11 taken along line 416 of FIG. 15.

FIG. 16 is a cutaway, perspective view of the hinge 400 of FIG. 11 along line 416 of FIG. 15. The hinging body portion 408 includes a hinge aperture 418. A hinge rod 420, for example in the form of a bolt with a securing nut, passes through the hinge apertures 418 of the pairs of hinge members 402 and 404. A flanged bearing 422 is provided within each hinge aperture 418 as a sleeve which surrounds the hinge rod 420. The flanged bearing 422 includes a flange member 424 which serves to separate adjacent ones of the hinge members 402 and 404. The flanged bearing 422 not only provides separation between hinge members 402 and 404, but may further serve as an electrolysis barrier between the aluminum hinge members 402 and 404 and the steel hinge rod 420.

Each hinge member 402 and 404 may further include a mounting aperture 426 which extends through the main body portion 406 and interconnect body portion 410. The aperture 426 has a wider opening on the main body portion 406 side and a narrower opening on the interconnect body portion 410 side. The aperture 426 is configured to receive a fastener inserted into the wider opening on the main body portion 406 side and threaded through the narrower opening on the interconnect body portion 410 side. The fastener in a preferred embodiment comprises a set screw (see reference 428 in FIG. 12). When the fastener is tightened in the mounting aperture 426, a distal end of the fastener emerges from the mounting aperture 426 to engage the undercut channel 366 or 382 (see FIG. 5). This serves to lock the hinge 400 in place at a desired location of the edge railing 306 and frame rail 316. Furthermore, it is recognized that the tightened fastener may cause a deformation of the material of the edge railing 306 or frame rail 316. The undercut channel 366 or 382 is advantageous because any material deformation caused by the tightened fastener will reside in the undercut channel 366 or 382, and that deformation will not impede the sliding of the hinge 400 along the length of the edge railing 306 and frame rail 316. In this way adjustments to hinge 400 positioning may be made. Furthermore, replacement of hinge parts may be made.

Figure 17:
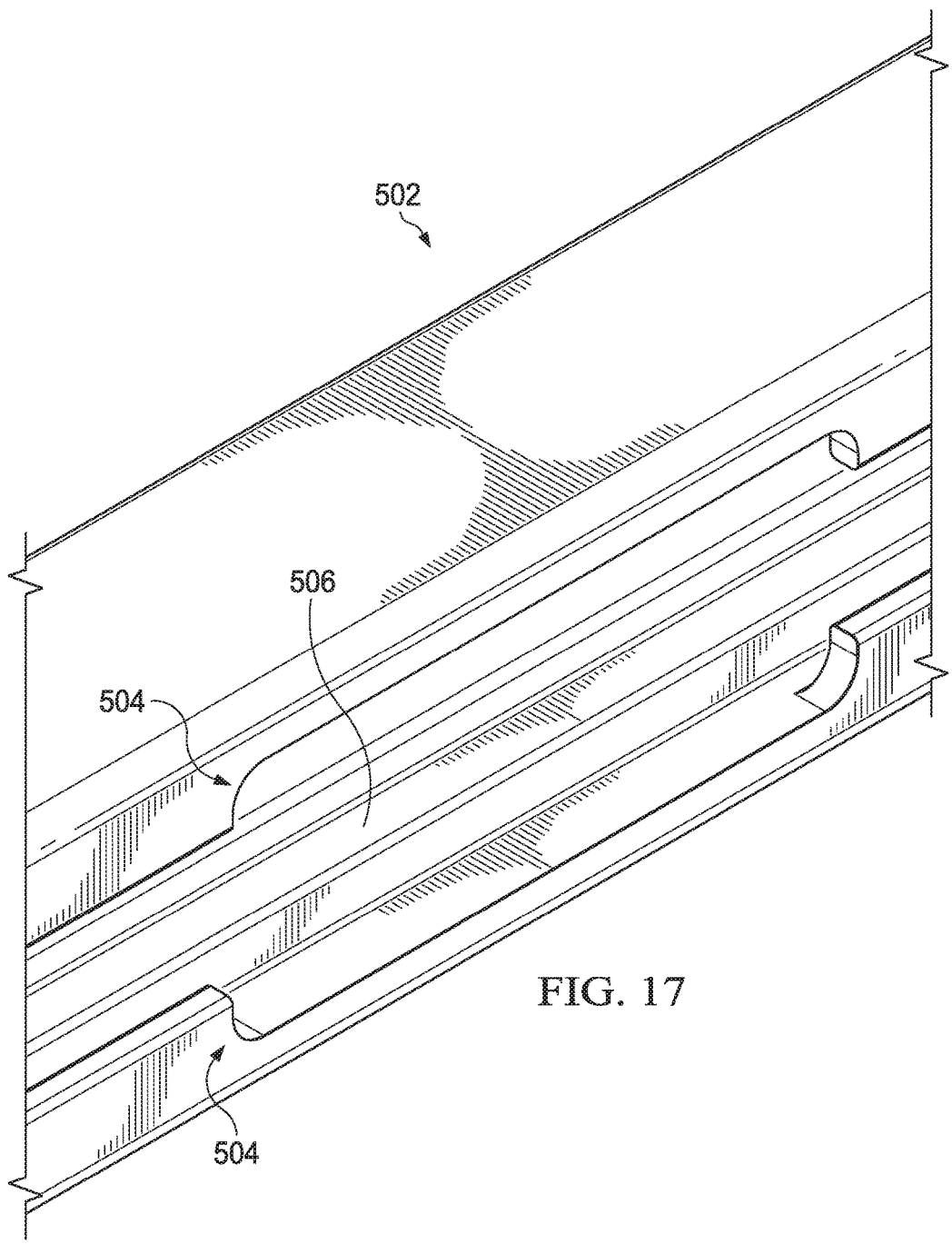
FIG. 17 is a perspective view of a railing that includes cutouts.

FIG. 17 is a perspective view of an edge railing 502 that includes cutouts 504. Cutouts 504 may be periodically formed in the key structure 506 along the length of the edge railing 502. These cutouts 504 provide locations where the retention provided by the key structure 506 has been removed. The hinge member 400 may be slide along the length of the edge railing 502 to a cutout 504 location, and at that point be removed from the edge railing 502. This obviates the need to slide the hinge 400 all the way to the end of the edge railing 502 for removal. Reconfiguration, repair and replacement operations with respect to the hinge 400 as well as the configuration of panels 102 or 302 are eased with the presence of cutouts 504.

Figure 18:
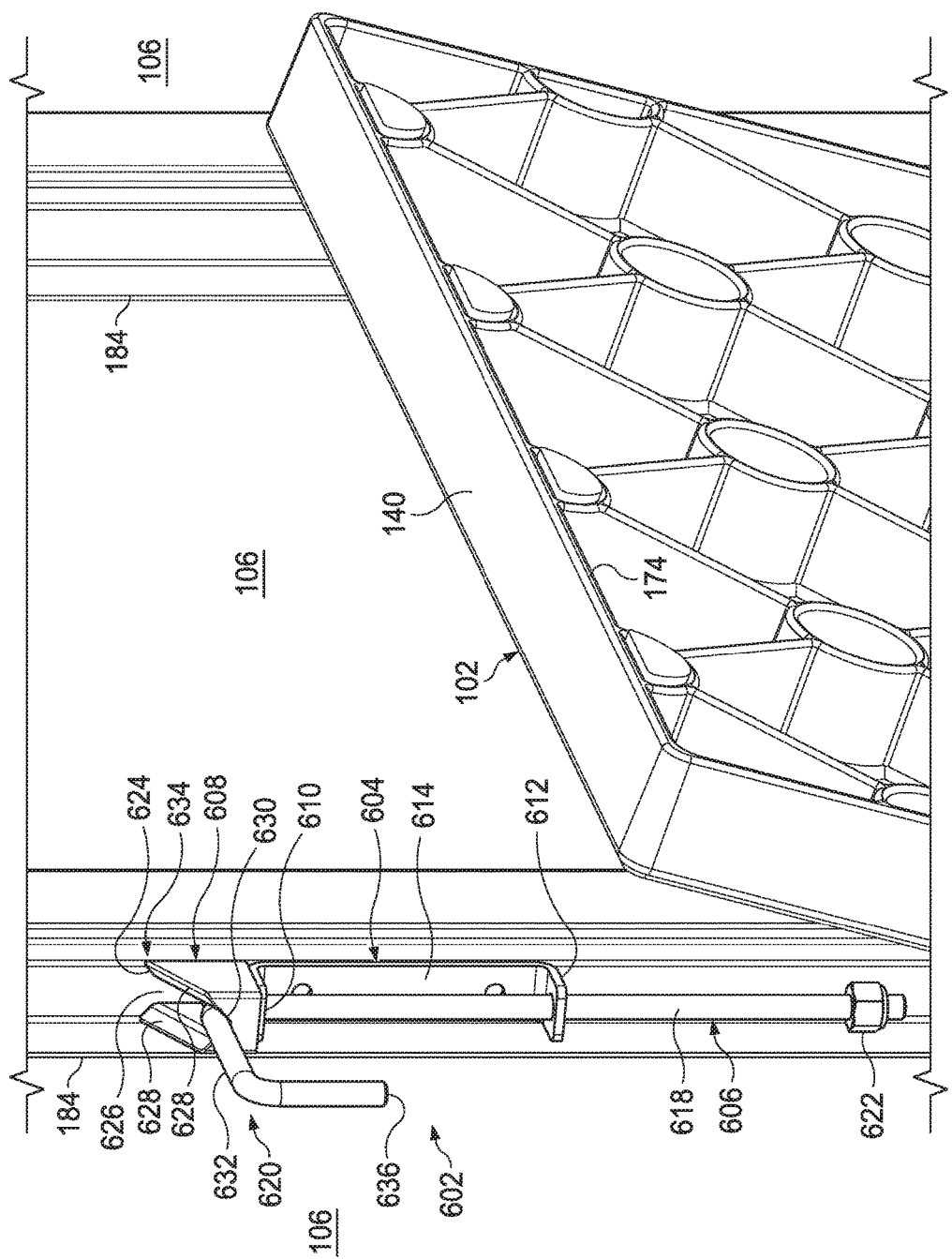
FIG. 18 is a perspective view of a panel, a vehicle side wall and an improved clip mechanism, wherein with the panel is located between the stored position and the load bearing position.

FIG. 18 is a perspective view of a panel 102, a vehicle side wall 106 and an improved clip mechanism 602. The vehicle side wall 106 includes support ribs 184 spaced along the side wall 106. The improved clip mechanism 602 is located on a support rib 184 of the truck. The improved clip mechanism 602 includes a body 604, a rod 606 and a cam block 608. The body 604 is coupled to the truck rib 184 and may be, in some embodiments, in the shape of a bracket that includes a top perpendicular portion 610, a bottom perpendicular portion 612 and an intermediate portion 614. The top and bottom perpendicular portions 610 and 612 include an opening (not shown) to slideably and rotatably receive the rod 606. The body 604 may be in any suitable shape that slideably and rotatably holds the rod 606 and may be made of any suitable material, such as, for example, a bent piece of sheet metal.

The rod 606 includes an elongated portion 618 and a hook portion 620. The hook portion includes a middle portion 632 and a distal end 636. The rod 606 is placed within the openings of the body 604 and is retained in the body 604 by the hook portion 620 on one end and a stopper 622, such as, for example, a nut, on the opposite end. As such, the rod 606 is movable with respect to the body 604 in an upward direction so that the stopper 622 approaches the bottom perpendicular portion 612 of the body 604 and in a downward direction so that the hook portion 620 approaches the top perpendicular portion 610 of the body 604. The rod 606 may be made of any suitable material and, in some embodiments, the rod 606 is made of a metal bar that is bent to include a hook portion 620.

The cam block 608 is located adjacent to the top perpendicular portion 610 and may be coupled to the support rib 184 and/or the body 604. The cam block 608 includes a sloped top surface 624 and a slot 626 in the sloped top surface 624. The sloped top surface 624 also includes two angles surfaces 628 on opposite sides of the slot 626 that direct the hook portion 620 of the rod 606 toward a trough portion 630 of the slot 626. The two angles surfaces 628 also orient the hook portion 620 so that it rotates between the locked position and the stored position when the rod 606 is released by a user, as will be described in more detail below.

In use, the improved clip mechanism 602 automatically rotates the rod 606 so that the hook portion 620 is aligned with the vehicle side wall 106 when the hook portion 620 is not in use to hold the panel 102. For example, in FIG. 18 the hook portion 620 of the rod 606 is supported in the trough portion 630 of the slot 626 when the rod 606 is in the stored position. The force of gravity on the rod 606 causes the rod 606 to remain in this position until moved by a user. When a user desires to use the improved clip mechanism 602 to hold the panel 102 in the stored position, the user lifts the rod 606 so that the hook portion 620 moves away from the cam block 608 and rotates the hook portion 620 ninety degrees. Once the hook portion 620 has been lifted and rotated ninety degrees, the panel 102 is raised to the stored position. As explained above, the panel 102 can be moved to the stored position by a user and may be assisted by a biasing mechanism. Once the panel 102 is in the stored position, the rod 606 is lowered so that the hook portion 620 engages the panel 102 and so that a distal end 636 of the hook portion 620 engages the bottom edge 174 of a support structure 140 of the panel 102. In this orientation, the panel 102 is in the stored position and the rod 606 is in the locked position.

Figure 19:
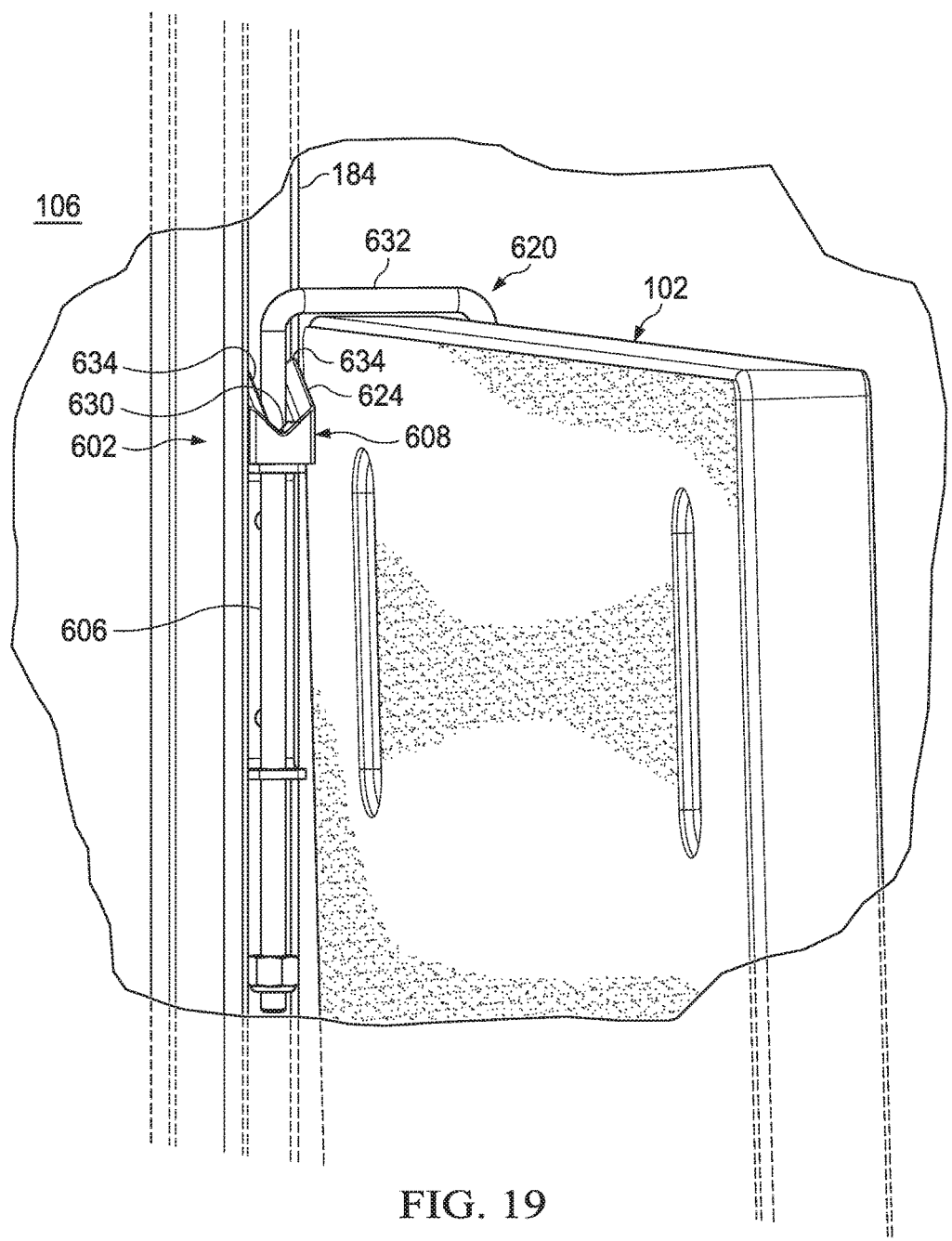
FIG. 19 is a perspective view of the panel, vehicle side wall and improved clip mechanism of FIG. 18 wherein the panel in the stored position.

FIG. 19 is a perspective view of a panel 102, a vehicle side wall 106 and an improved clip mechanism 602 in which a portion of the vehicle side wall 106 has been removed to provide a view of the improved clip mechanism 602 in the locked position. Gravity acting on the rod 606 holds the rod 606 in this position until a user moves the rod 606. As such, the rod 606 and the panel 102 will remain in the stored position until the rod 606 is moved by a user.

When a user desires to move the panel 102 into the load bearing position, the rod 606 is raised until the distal end 636 (see FIG. 18) of the hook portion 620 no longer engages the panel 102. The panel 102 may then be lowered into the load bearing position. At this point, the user releases the rod 606 and, due to the force of gravity on the rod 606, the rod 606 will move downward until the hook portion 620 contacts the cam block 608. When the rod 606 is in the rotational orientation of the locked position (as shown in FIG. 19), a middle portion 632 of the hook portion 620 will contact a top portion 634 of the sloped top surface 624 of the cam block 608. As the rod 606 continues to move toward the trough portion 630 of the cam block 608, the interaction between the middle portion 632 of the hook portion 620 and the top portion 634 of the sloped top surface 624, in conjunction with the force of gravity acting on the rod 606, will cause the rod 606 to rotate ninety degrees into the stored position (see FIG. 18). In the stored position, the hook portion 620 of the rod 606 is aligned with the side wall 106 of the vehicle so that the hook portion 620 does not protrude into the vehicle where it may contact packages and/or users.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below," "top" and "bottom" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A system for use in a package delivery vehicle, comprising:
    an edge railing;
    a panel comprising a peripheral support structure perpendicularly extending from a flat top portion, the peripheral support structure comprising a hinged end wall and a free end wall disposed opposite the hinged end wall, and a first lateral wall and a second lateral wall disposed opposite the first lateral wall;
    a panel hinge member extending from an exterior surface of the hinged end wall and the panel hinge member being disposed proximate to and offset from the first lateral wall, the panel hinge member having an enclosed through hole with an axis that is parallel to the hinged end wall; and
    a hinge body mounted to the edge railing and pivotally coupled to the panel hinge member to allow the panel hinge member and the panel to pivot with respect to the hinge body; and
    wherein the panel and the panel hinge member are formed as a unitary monolithic body.

2. The system according to claim 1, wherein the unitary monolithic body is a liquid cast body.

3. The system according to claim 2, wherein the liquid cast body is formed of one or more of a thermoplastic material, a thermoset material and an epoxy material.

4. The system according to claim 3, wherein the liquid cast body includes a reinforcing material.

5. The system according to claim 4, wherein the reinforcing material is selected from the group consisting of: reinforcing fibers, microspheres and filler materials.

6. The system according to claim 1, wherein the unitary monolithic body is an injection molded body.

7. The system according to claim 6, wherein the injection molded body is formed of one or more of a thermoplastic material, a thermoset material and an epoxy material.

8. The system according to claim 7, wherein the injection molded body includes a reinforcing material.

9. The system according to claim 8, wherein the reinforcing material is selected from the group consisting of: reinforcing fibers, microspheres and filler materials.

10. The system according to claim 1, wherein the panel includes a plurality of structural support ribs.

11. The system according to claim 1, wherein the enclosed through hole receives a rod to pivotally couple the panel hinge member to the hinge body.

12. A panel for use in a package delivery vehicle, comprising
    a flat top member having a peripheral support structure perpendicularly extending from the flat top member, the peripheral support structure comprising a first end wall and a second end wall disposed opposite the first end wall, and a first lateral wall and a second lateral wall disposed opposite the first lateral wall;
    a plurality of ribs extending from a bottom surface of the flat top member;
    a panel hinge member extending from an exterior surface of the first end wall of the peripheral support structure and the panel hinge member being disposed proximate to and offset from the first lateral wall, the panel hinge member defining an enclosed through hole configured to receive a rod, an axis of the through hole being parallel with the first end wall; and
    wherein the flat top member, the plurality of ribs, the peripheral support structure, and the panel hinge member are parts of a unitary monolithic body.

13. The panel of claim 12 wherein the flat top member defines at least one finger opening.

14. The panel of claim 12, wherein the unitary monolithic body is one of a liquid cast body or an injection molded body.

15. The panel of claim 12, wherein the unitary monolithic body is formed of one or more of a thermoplastic material, a thermoset material and an epoxy material.

16. The panel of claim 15, wherein the unitary monolithic body includes a reinforcing material.

17. The panel of claim 16, wherein the reinforcing material is selected from the group consisting of: reinforcing fibers, microspheres and filler materials.

18. The panel according to claim 12 wherein the flat top member includes an anti-skid coating.

19. The panel according to claim 18 wherein the flat top member defines at least one finger opening.

20. A panel for use in a package delivery vehicle, comprising
a flat top member defining at least one finger opening and having an anti-skid coating;
a peripheral support structure extending perpendicularly from the flat top member, the peripheral support structure comprising a first end wall and a second end wall disposed opposite the first end wall, and a first lateral wall and a second lateral wall disposed opposite the first lateral wall;
a plurality of ribs extending from a bottom surface of the flat top member;
a first panel hinge member extending from an exterior surface of the first end wall of the peripheral support structure and at least a portion of the first panel hinge member being disposed proximate to and offset from the first lateral wall, the first panel hinge member defining a first enclosed through hole configured to receive a first rod, an axis of the first through hole being parallel with the first end wall;
a second panel hinge member extending from the exterior surface of the first end wall and being disposed proximate to and offset from the second lateral wall, the second panel hinge member defining a second enclosed through hole configured to receive a second rod, an axis of the second through hole being parallel with the first end wall; and
wherein the flat top member, the plurality of ribs, the peripheral support structure, and the first and second panel hinge members are parts of a unitary monolithic injection molded body.

21. A hinged load panel, comprising
a flat top portion;
a peripheral support structure extending perpendicularly from the flat top portion and comprising a pair of lateral walls and a pair of end walls extending between the lateral walls;
a plurality of ribs extending from a bottom surface of the flat top portion, the plurality of ribs forming a pattern repeating over the bottom surface, the pattern comprising a plurality of cylindrical hub ribs and a plurality of spoke ribs extending from each cylindrical hub rib, each spoke rib connected at one end to a first cylindrical hub rib and at an opposite end to an adjacent cylindrical hub rib; and
a panel hinge member extending from an exterior surface of one of the end walls and being disposed proximate and offset at a distance from a first lateral wall of the pair of lateral walls, the panel hinge member defining a through hole;
a rod received in the through hole to rotatably couple the panel hinge member to a hinge body; and
wherein the flat top portion, the plurality of ribs, the peripheral support structure, and the panel hinge member are parts of a unitary monolithic body.

22. The panel of claim 21 wherein an axis of the through hole is parallel with the one end wall.

23. The panel of claim 21 wherein each of the plurality of cylindrical hub ribs is hollow.

24. The panel of claim 21, wherein the unitary monolithic body is one of a liquid cast body or an injection molded body.

25. The panel of claim 24, wherein the unitary monolithic body is formed of one or more of a thermoplastic material, a thermoset material, and an epoxy material.

26. The panel of claim 25, wherein the unitary monolithic body includes a reinforcing material.

27. The panel of claim 26, wherein the reinforcing material is selected from the group consisting of: reinforcing fibers and microspheres.

* * * * *